(12) United States Patent
Yoshida

(10) Patent No.: US 8,601,478 B2
(45) Date of Patent: Dec. 3, 2013

(54) DIVISION, LINKING AND SEQUENTIAL EXECUTION OF WORKFLOWS BASED ON THE FEWEST NUMBER OF DIVIDED PARTITIONS

(75) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 12/463,421

(22) Filed: May 11, 2009

(65) Prior Publication Data

US 2009/0282417 A1 Nov. 12, 2009

(30) Foreign Application Priority Data

May 12, 2008 (JP) ................................ 2008-125113

(51) Int. Cl.
*G06F 9/50* (2006.01)
(52) U.S. Cl.
USPC .......................................... 718/102; 718/104
(58) Field of Classification Search
None
See application file for complete search history.

(56) References Cited

U.S. PATENT DOCUMENTS

| 8,139,243 | B2 * | 3/2012 | Isshiki et al. ................. 358/1.15 |
| 8,307,366 | B2 * | 11/2012 | Lipton et al. .................. 718/102 |
| 2001/0049663 | A1 * | 12/2001 | Tanioka .......................... 705/51 |
| 2004/0111430 | A1 * | 6/2004 | Hertling et al. ............. 707/104.1 |
| 2004/0148605 | A1 * | 7/2004 | Kim ............................. 718/100 |
| 2006/0143611 | A1 * | 6/2006 | Sadiq ............................ 718/100 |
| 2006/0178924 | A1 | 8/2006 | Yagiura |
| 2006/0206450 | A1 * | 9/2006 | Fletcher et al. .................. 707/1 |
| 2007/0073883 | A1 * | 3/2007 | Chafle et al. ................. 709/226 |
| 2007/0096954 | A1 * | 5/2007 | Boldt et al. ..................... 341/50 |
| 2007/0106995 | A1 | 5/2007 | Osaka |
| 2007/0136087 | A1 * | 6/2007 | Yamaguchi ....................... 705/1 |
| 2007/0233543 | A1 * | 10/2007 | Oshima ........................... 705/8 |
| 2007/0245146 | A1 * | 10/2007 | Satake et al. .................. 713/176 |
| 2008/0184236 | A1 * | 7/2008 | Yamauchi et al. ............ 718/100 |
| 2008/0229306 | A1 * | 9/2008 | Omori ......................... 718/100 |
| 2009/0122333 | A1 * | 5/2009 | Kato ........................... 358/1.15 |

FOREIGN PATENT DOCUMENTS

| JP | 10-063751 A | 3/1998 |
| JP | 2003-091386 A | 3/2003 |
| JP | 2006-195847 A | 7/2006 |
| JP | 2007-129580 A | 5/2007 |
| WO | 2007/043420 A1 | 4/2007 |

* cited by examiner

*Primary Examiner* — Meng-Ai An
*Assistant Examiner* — Benjamin Wu
(74) *Attorney, Agent, or Firm* — Canon USA Inc. IP Division

(57) ABSTRACT

A workflow executing method to execute a workflow of a plurality of steps according to a workflow definition. The method includes obtaining setting information of a user instructing execution of the workflow, which is setting information related to the execution of the workflow. The method also includes modifying the workflow definition corresponding to the workflow of which the user instructed execution, based on the obtained setting information. The method continues by dividing the workflow definition modified with the modifying unit for each workflow executing apparatus that executes the workflow definition. The method also includes executing at least one of the divided workflow definitions and sending at least one divided workflow definition to another workflow executing apparatus that executes processing based on the workflow definition, whereby workflow definitions are modified to match user settings, and the modified workflow definitions are divided to match apparatuses executing the workflow definition.

10 Claims, 28 Drawing Sheets

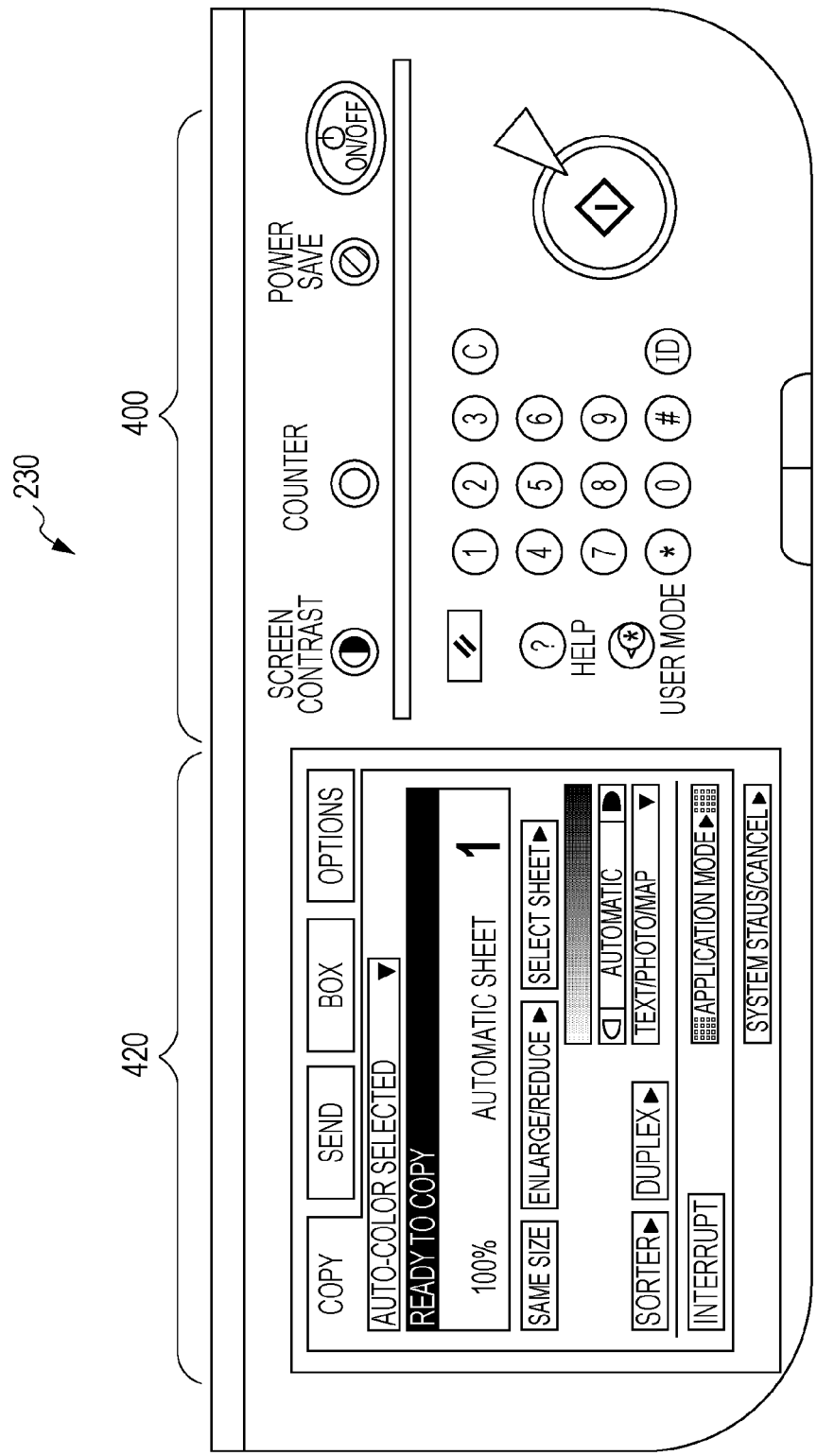

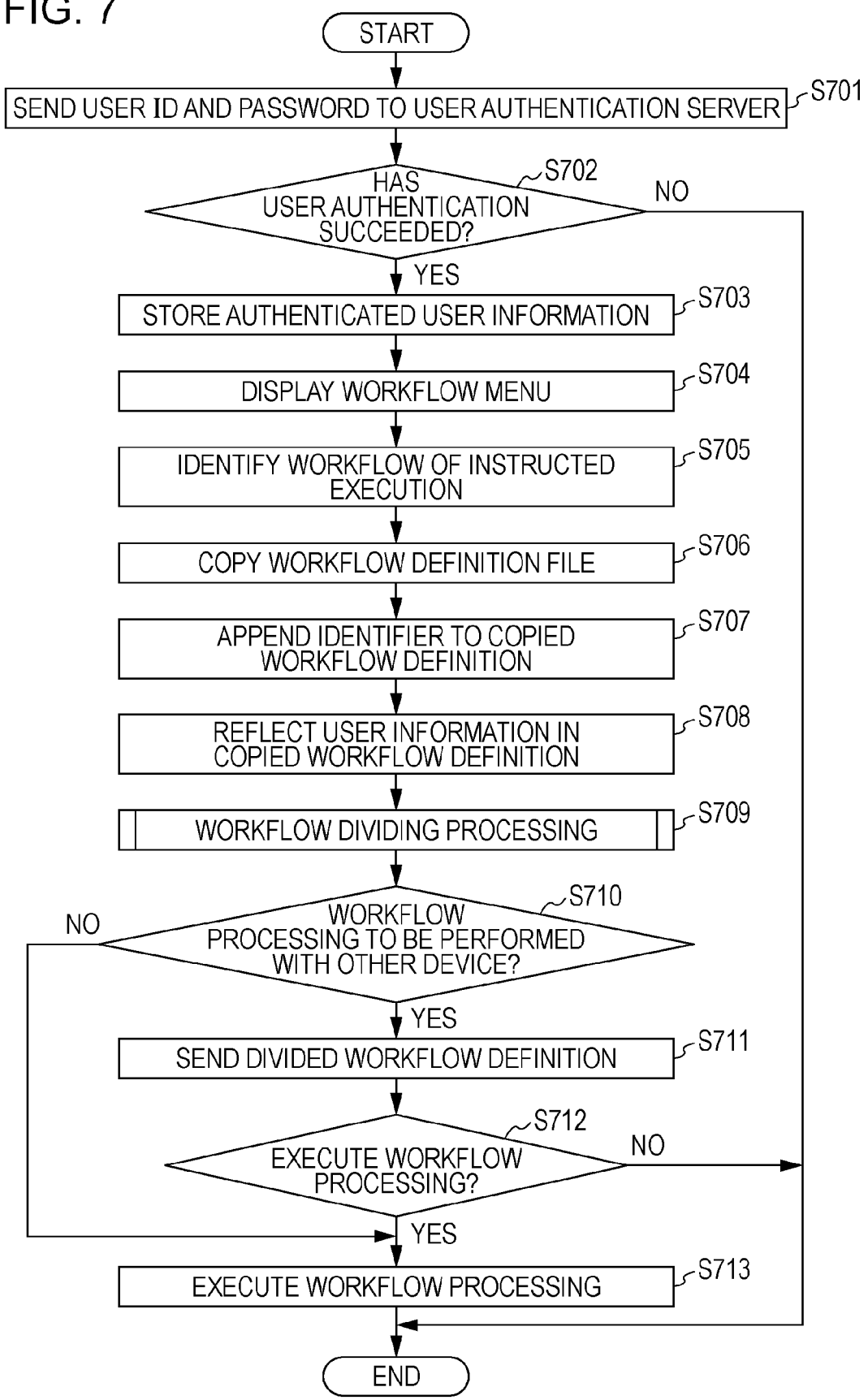

| USER ID | PASSWORD | EMAIL ADDRESS | USER CERTIFICATE HOLDING DEVICE |
|---|---|---|---|
| UserA | * * * * | user-a@xxx.xxx.xx.xx | DEVICE (2) (IP: XXX.XXX.XXX.XXX) |
| UserB | * * * * | user-b@xxx.xxx.xx.xx | DEVICE (1) (IP: XXX.XXX.XXX.XXX) |
| UserC | * * * * | user-c@xxx.xxx.xx.xx | — |
|  |  |  |  |

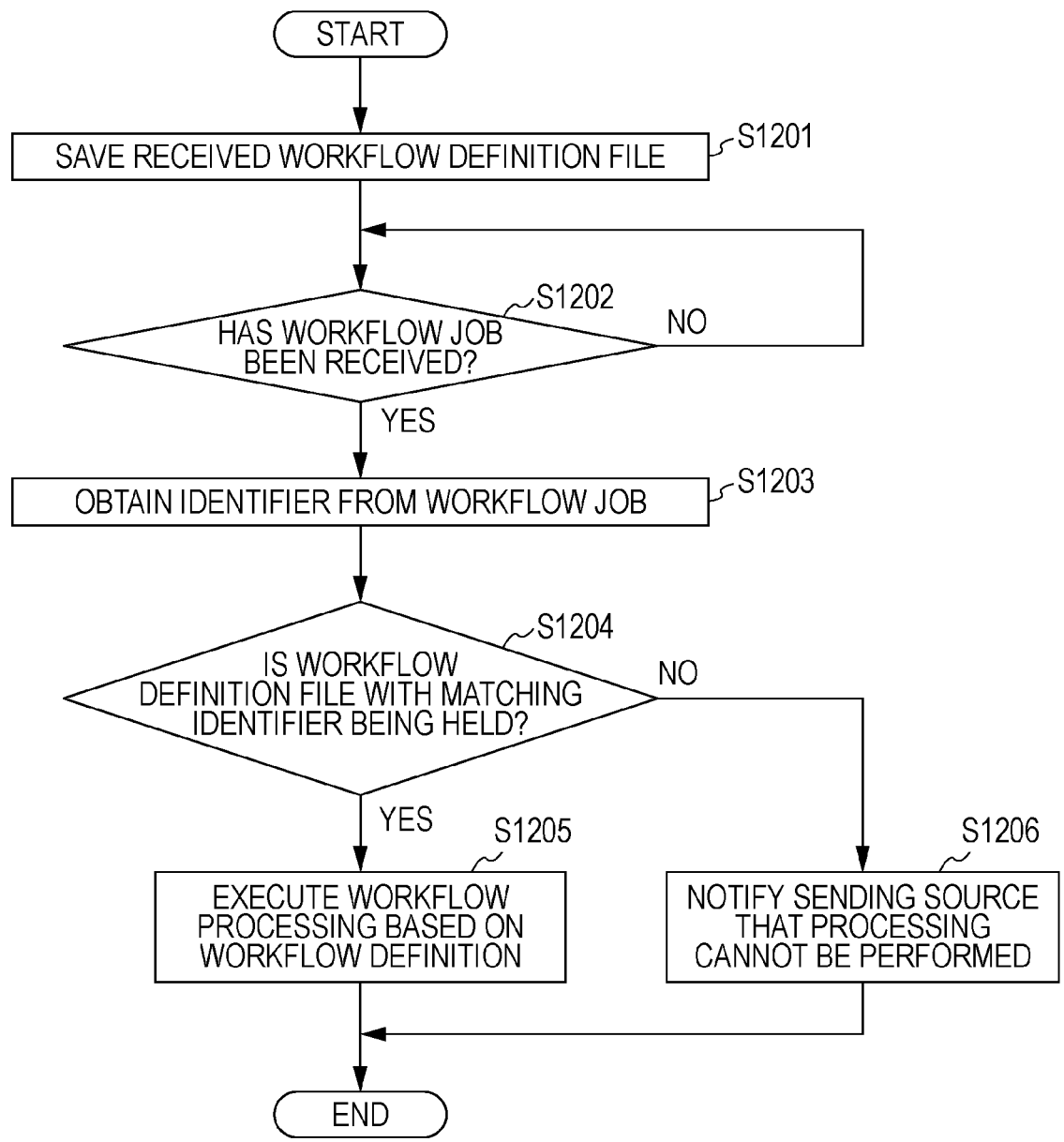

FIG. 15

| USER ID | PASSWORD | EMAIL ADDRESS | USER CERTIFICATE HOLDING DEVICE | USER DEDICATED BOX | USER DEDICATED ADDRESS BOOK |
|---|---|---|---|---|---|
| UserA | **** | user-a@xxx.xxx.xx.xx | DEVICE (2) (IP: XXX.XXX.XXX.XXX) | DEVICE (1) (IP: XXX.XXX.XXX.XXX) Box-A | DEVICE (2) (IP: XXX.XXX.XXX.XXX) A |
| UserB | **** | user-b@xxx.xxx.xx.xx | DEVICE (1) (IP: XXX.XXX.XXX.XXX) | — | — |
| UserC | **** | user-c@xxx.xxx.xx.xx | — | DEVICE (1) (IP: XXX.XXX.XXX.XXX) Box-C | — |
|  |  |  |  |  |  |

FIG. 22

| USER ID | PASSWORD | EMAIL ADDRESS | USER CERTIFICATE HOLDING DEVICE | USER DEDICATED BOX | USER DEDICATED ADDRESS BOOK |
|---|---|---|---|---|---|
| UserA | **** | user-a@xxx.xxx.xx.xx | DEVICE (1)<br>(IP: XXX.XXX.XXX.XXX)<br>DEVICE (2)<br>(IP: XXX.XXX.XXX.XXX) | DEVICE (1)<br>(IP: XXX.XXX.XXX.XXX) Box-A | DEVICE (2)<br>(IP: XXX.XXX.XXX.XXX) A |
| UserB | **** | user-b@xxx.xxx.xx.xx | DEVICE (1)<br>(IP: XXX.XXX.XXX.XXX) | — | — |
| UserC | **** | user-c@xxx.xxx.xx.xx | — | DEVICE (1)<br>(IP: XXX.XXX.XXX.XXX) Box-C | — |
|  |  |  |  |  |  |

FIG. 26

| USER ID | PASSWORD | EMAIL ADDRESS | USER CERTIFICATE HOLDING DEVICE | USER DEDICATED BOX | USER DEDICATED ADDRESS BOOK |
|---|---|---|---|---|---|
| UserA | **** | user-a@xxx.xxx.xx.xx | DEVICE (2) (IP: XXX.XXX.XXX.XXX) | DEVICE (1) (IP: XXX.XXX.XXX.XXX) Box-A | DEVICE (3) (IP: XXX.XXX.XXX.XXX) A |
| UserB | **** | user-b@xxx.xxx.xx.xx | DEVICE (1) (IP: XXX.XXX.XXX.XXX) | — | — |
| UserC | **** | user-c@xxx.xxx.xx.xx | — | DEVICE (1) (IP: XXX.XXX.XXX.XXX) Box-C | — |
| | | | | | |

DIVISION, LINKING AND SEQUENTIAL EXECUTION OF WORKFLOWS BASED ON THE FEWEST NUMBER OF DIVIDED PARTITIONS

BACKGROUND OF THE INVENTION

1. Field of the Invention

The present invention relates to a workflow executing apparatus, workflow executing method, and computer program, particularly suitable for executing a workflow.

2. Description of the Related Art

In the office environment, various types of devices such as a multifunctional peripheral (MFP), printer, server, and so forth are connected to a network, and the devices thereof are shared and used by users. Systems also exist wherein not only are devices connected to the network used, but multiple devices connected to the network collaboratively execute processing. Content of processing performed with multiple devices collaborating is a workflow job, the specific processing flow is a workflow, and the definitions/regulations of the processing flow are workflow definitions.

A system to execute workflow jobs is described in Japanese Patent Laid-Open No. 2006-195847. With this system, the server obtains information about a device that can execute processing from a discovery apparatus, and using processing speed, cost, network traffic and the like as determination factors, selects the optimal device from the obtained information, and executes the workflow.

Additionally, Japanese Patent Laid-Open No. 2007-129580 describes a system. With the system therein, when executing a workflow to collaboratively process multiple tasks, execution parameters for each task for each user to execute (e.g. email address of transmission destination) are customized, whereby a workflow job according to the user is realized.

To ease the use of device functions, which have become highly functional and sophisticated in recent years, customizing the device functions for each user is preferable. In the case of customizing device functions for each user, the user performs settings for him/her to use, such as performing settings on a device that the user uses often or a device that is closest to the user.

As customizing of the device by the user advances, the following environment may be realized by way of example. An environment where "the certificate of user A is set in the device A closest to the seat of user A, the certificate of user B is set in the device B closest to the seat of user B, and the dedicated storage region of user A and user B is set in the device C having the greatest storage region."

However, if device settings differ for each user or processing that can be executed by the device differs by user, certain functions may not be permitted when executing a workflow job. That is to say, with techniques according to related art, in the case of searching for a device that can execute a workflow processing, selecting the device based on device functionality is a prerequisite thereof.

Therefore, with the techniques according to the related art, the searched device may have the function to execute the workflow processing, but the user instructing the execution of the workflow may not have permission to use such function. Accordingly, there may be cases wherein the function thereof can be used or cannot be used, depending on the user. Further, with the related art described above, the settings performed by the user are performed for each device. Therefore, in order to execute the workflow processing along with settings unique to a user, there have been cases wherein workflow processing for an identified device must be executed, and otherwise the workflow processing could not be correctly executed.

SUMMARY OF THE INVENTION

According to an embodiment of the present invention, a workflow executing apparatus to execute a workflow made up of multiple steps according to a workflow definition. The apparatus includes an obtaining unit to obtain setting information of a user instructing execution of the workflow, which is setting information related to the execution of the workflow. The apparatus also includes a modifying unit to modify the workflow definition corresponding to the workflow of which the user instructed execution, based on the setting information obtained with the obtaining unit. A dividing unit to divide the workflow definition modified with the modifying unit for each workflow executing apparatus that executes the workflow definition. An executing unit to execute at least one of the workflow definitions divided with the dividing unit and a sending unit to send at least one workflow definition divided with the dividing unit to another workflow executing apparatus that executes processing based on the workflow definition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating details of an example of an external view configuration of an operating unit of an image forming apparatus according to the first embodiment of the present invention.

FIG. 7 is a flowchart describing an example of the processing of a device (1) in the event of executing workflow processing based on a workflow definition file according to the first embodiment of the present invention.

FIG. 13 is a flowchart describing an example of the processing of a device (2) in the event of executing workflow processing based on the workflow definition file according to the first embodiment of the present invention.

FIG. 15 is a diagram illustrating an example of a management table used to manage user information with a user authentication server according to a second embodiment of the present invention.

FIG. 22 is a diagram illustrating an example of a management table used to manage user information with a user authentication server according to a third embodiment of the present invention.

FIG. 26 is a diagram illustrating an example of a management table used to manage user information with a user authentication server according to a fourth embodiment of the present invention.

DESCRIPTION OF THE EMBODIMENTS

Various embodiments of the present invention will now be described in detail in accordance with the accompanying drawings.

A first embodiment of the present invention will be described with reference to the appended drawings.

System Configuration

Figure 1:
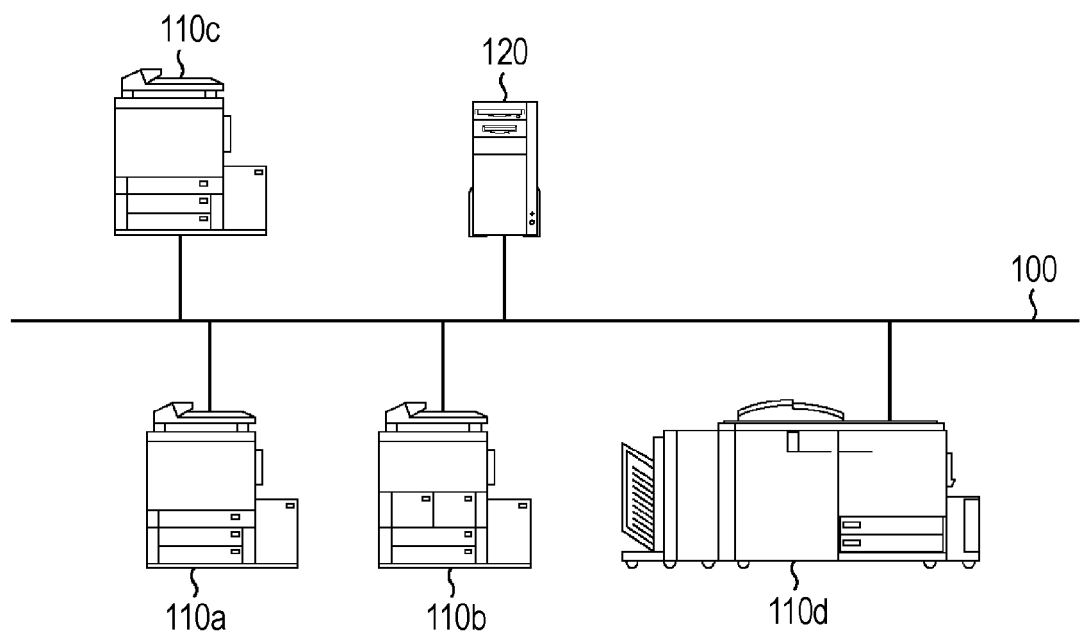
FIG. 1 is a diagram illustrating an example of an overall configuration of a workflow processing system according to a first embodiment of the present invention.

FIG. 1 is a diagram illustrating an example of an overall configuration of a workflow processing system. In FIG. 1, the workflow processing system has an image forming apparatus 110a, 110b, 110c, 110d and a user authentication server 120. The image forming apparatus 110a, 110b, 110c, 110d and user authentication server 120 are connected via a network 100 so as to be mutually communicable. Note that in FIG. 1, an example is given of a case wherein four image forming apparatuses 110 are provided to the workflow processing system, but the number of image forming apparatuses 110 should not be limited to this.

The image forming apparatus 110 is a digital multi-functional peripheral (MFP), for example. The image forming apparatus 110 has a function to hold a workflow definition file wherein a workflow definition is described, and a function to analyze the content of the workflow definition described in the held workflow definition file. Further, the image forming apparatus 110 has a function to update the workflow definition (workflow definition file) and a function to execute processing according to the content of the analyzed workflow definition.

Additionally, the image forming apparatus 110 has a scan function to read a paper document, a print function to perform printing of data, a transmission/reception function to perform transmission/reception of data (FAX function and the like), a storage function to perform data storage, and an editing function to perform data operations.

A user authentication server 120 manages user setting information which is user identifying information necessary for authenticating the user and setting information for each item of the image forming apparatus 110 (items to influence the execution of the workflow definition), and is setting information for each user.

Configuration of Image Forming Apparatus

Figure 2:
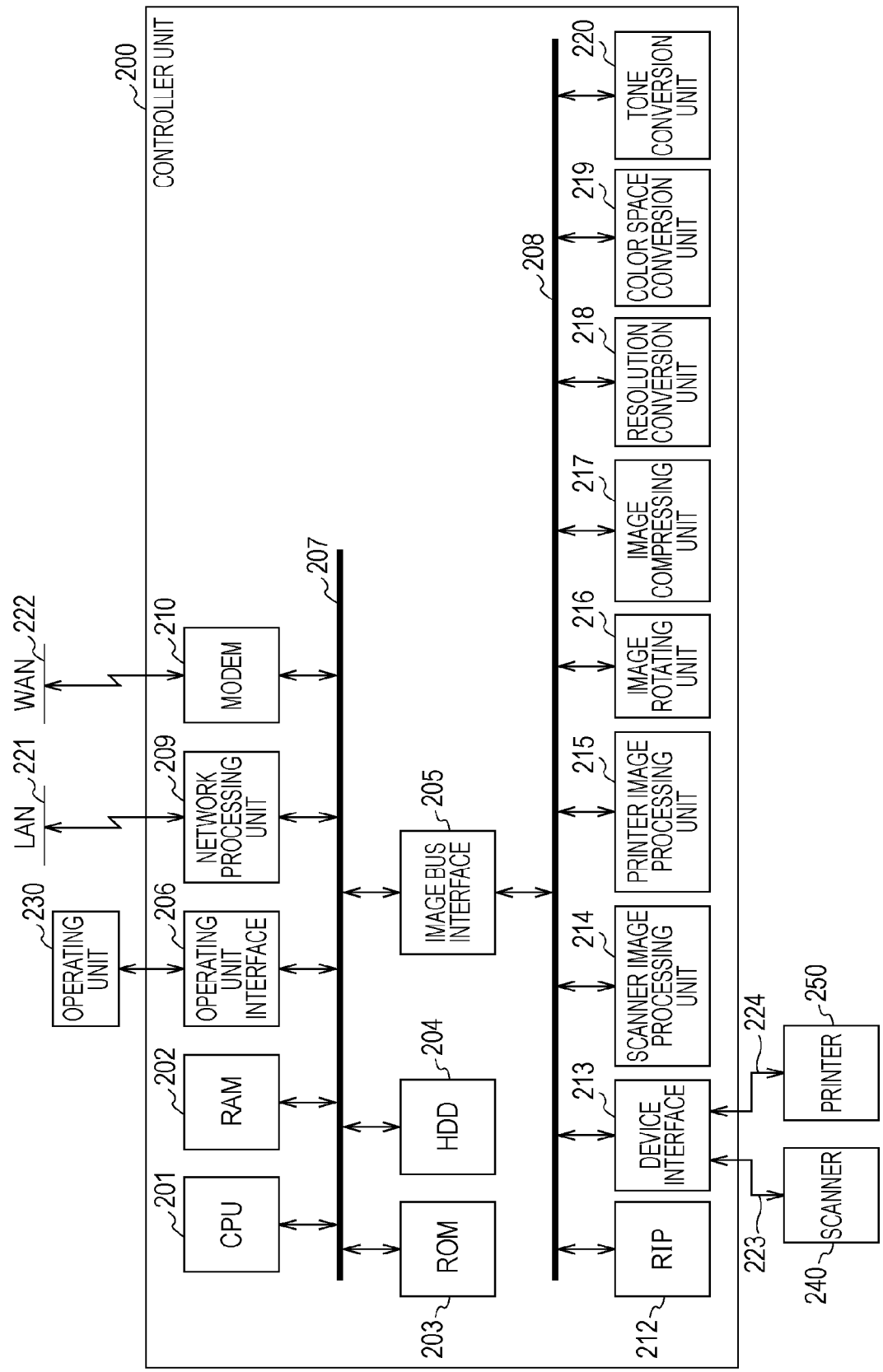
FIG. 2 is a block diagram illustrating an example of a configuration of an image forming apparatus according to the first embodiment of the present invention.

FIG. 2 is a block diagram illustrating an example of the configuration of the image forming apparatus 110. A controller unit 200 is a controller to perform input/output of image information and device information. The controller unit 200 is mutually connected with a scanner 240 which is an image input device and a printer 250 which is an image output device. Also, the controller unit 200 is mutually connected with a LAN 221 or WAN (public circuit) 222. A CPU 201 is a controller to control the overall system of the image forming apparatus 110. RAM 202 is a system work memory for the CPU 201 to operate, and is image memory to temporarily store the image data. ROM 203 is a boot ROM, wherein a system boot program of the image forming apparatus 110 is stored.

An HDD 204 is a hard disk drive, and stores system software, image data, workflow definition files and so forth. An operating unit interface 206 is an interface with an operating unit (UI) 230, and outputs image data displayed on the operating unit 230 as to the operating unit 230. Also, the operating unit interface 206 transmits the information that the user has input by operating the operating unit 230 of the image forming apparatus 110 to the CPU 201. The network processing unit 209 is mutually connected with the LAN 221, and performs input/output of information with external devices via the LAN 221. A model 210 is mutually connected with the WAN 222, and performs input/output of information with the external apparatus via the WAN 222. The devices described above are disposed on a system bus 207.

An image bus interface 205 is mutually connected with an image bus 208 that transfers image data at high speed with the system bus 207, and is a bus bridge that exchanges data configuration. The image bus 208 is configured with a PCI bus or IEEE 1394. The above-described devices are disposed on the image bus 208.

A raster image processor (RIP) 212 expands a PDL code into a bit map image. A device interface 213 is mutually connected with a scanner 240 or printer 250 which are image input/output devices and the controller unit 200, and performs synchronous system/non-synchronous system conversion of image data. A scanner image processing unit 214 performs correction, processing, and editing as to the image data input from the scan 240 or the like. Also, the scanner image processing unit 214 determines from a chroma signal or the like of the image data as to whether the image data input from the scanner 240 or the like is of a color document or a monochrome document, and stores the result thereof.

A printer image processing unit 215 performs correction, processing, and editing as to the image data output to the printer 250 or the like. An image rotating unit 215 collaborates with the scanner image processing unit 214 to rotate the image data simultaneously with the readout of the image data input from the scanner 240, and stores this in memory. Also, the image rotating unit 216 can rotate an image in memory and store this in the memory, or can collaborate with the printer image processing unit 215 and print-output while rotating the image data in the memory.

A resolution conversion unit 218 converts the resolution of image data in memory and stores this in the memory. A color-space conversion unit 219 converts a YUV image in memory to a Lab image by matrix calculation, for example, and stores this in the memory. A tone conversion unit 220 converts an image data of 8 bit, 256 tone in memory for example into 1 bit, 2 tone with a method such as error dispersion processing or the like and stores this in the memory. An image compression unit 217 compresses/expands multi-value image data according to JPEG for example, and compresses/expands binary image data according to JBIG, MMR, MR, or MH.

The image rotating unit 216, resolution conversion unit 218, color-space conversion unit 219, tone conversion unit 220, and image compression unit 217 can each operate collaboratively. For example, in the case of rotating the image data in the memory and performing resolution conversion, such processes can be performed without processing via the memory.

Figure 3:
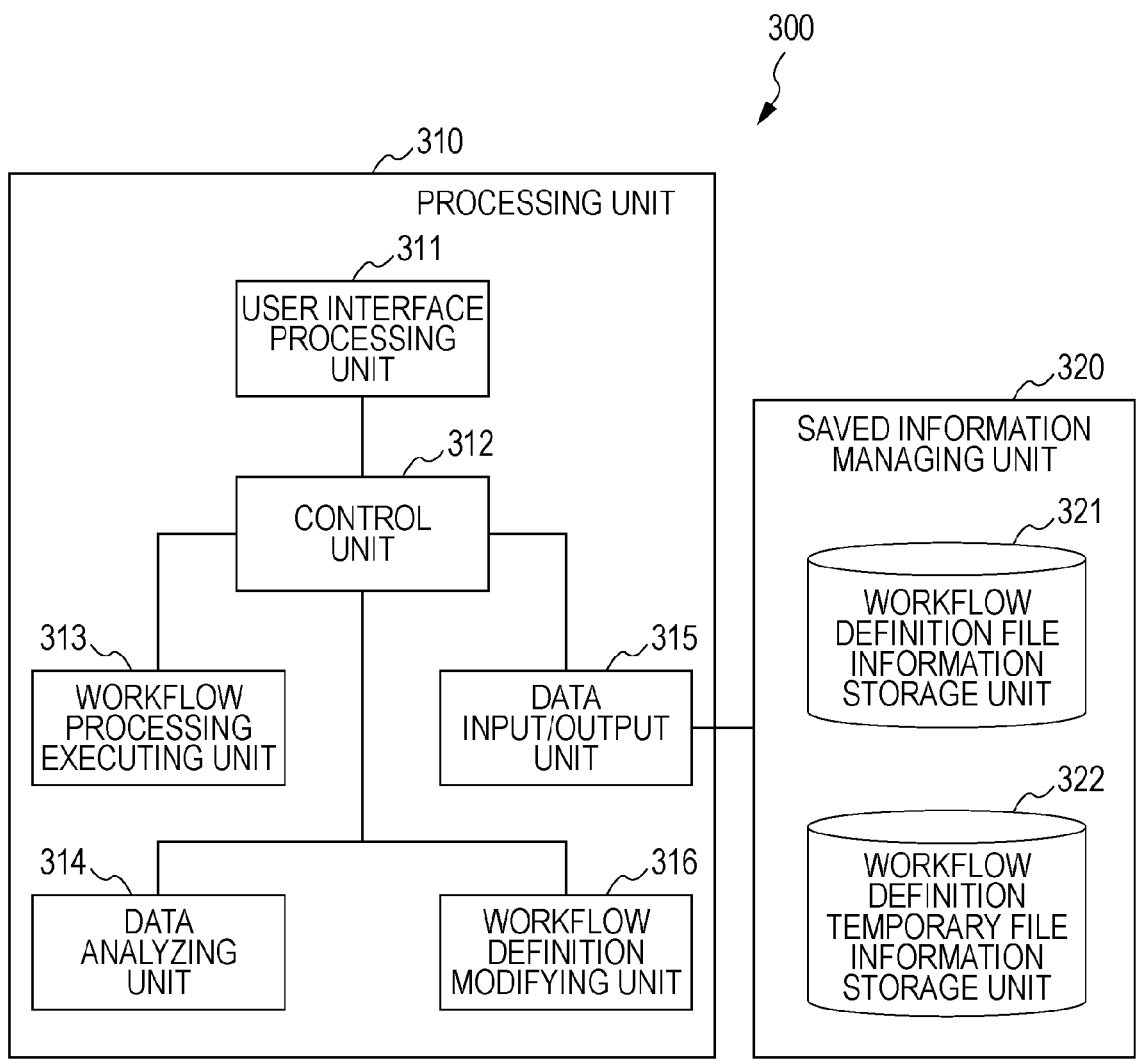
FIG. 3 is a block diagram illustrating an example of a functional configuration of workflow processing software executed with an image forming apparatus according to the first embodiment of the present invention.

FIG. 3 is a block diagram illustrating an example of a function configuration of the workflow processing software executed with the image forming apparatus 110. The workflow processing software (application program) therein is stored in the HDD 204, expanded with the RAM 202 and executed with the CPU 201. In FIG. 3, the workflow processing software 300 has, largely divided, a processing unit 310 and a storage information management unit 320.

The processing unit 310 has a user interface unit 311, control unit 312, workflow processing executing unit 313, data analysis unit 314, data input/output unit 315, and workflow definition modifying unit 316.

The user interface unit 311 receives information from the operating unit 230 via the operating unit interface 206. Also, the user interface processing unit 311 transmits the information to the operating unit 230. The data input/output unit 315 manages input/output of the data performed between the processing unit 310 and storage information management unit 320. The data analysis unit 314 performs analysis of the workflow definition file and so forth. The workflow processing executing unit 313 performs processing of the workflow processing and so forth. The workflow definition modifying unit 316 performs workflow definition updating, modifying, and dividing processing. The control unit 312 controls the processing performed with the user interface processing unit 311, workflow processing executing unit 313, data analysis unit 314, data input/output unit 315, and workflow definition modifying unit 316.

The storage information management unit 320 manages a workflow definition file information storage unit 321 and a workflow definition temporary file information storage unit 322. Thus, the workflow definition file information storage unit 321 stores the information of the workflow definition file which is a file wherein a workflow definition is set. The workflow definition temporary file information storage unit 322 stores the information of a temporary workflow definition generated with the workflow definition modifying unit 316. The information itself is stored in the HDD 204, for example.

FIG. 4 is a diagram illustrating an example of an external view configuration of the operating unit 230 of the image forming apparatus 110. Note that for simplicity of description, in FIG. 4 the external view configuration of the operating unit 230 is shown simplified. In FIG. 4, the operating unit 230 has a key input unit 400 and touch panel unit 420.

Figure 5A:
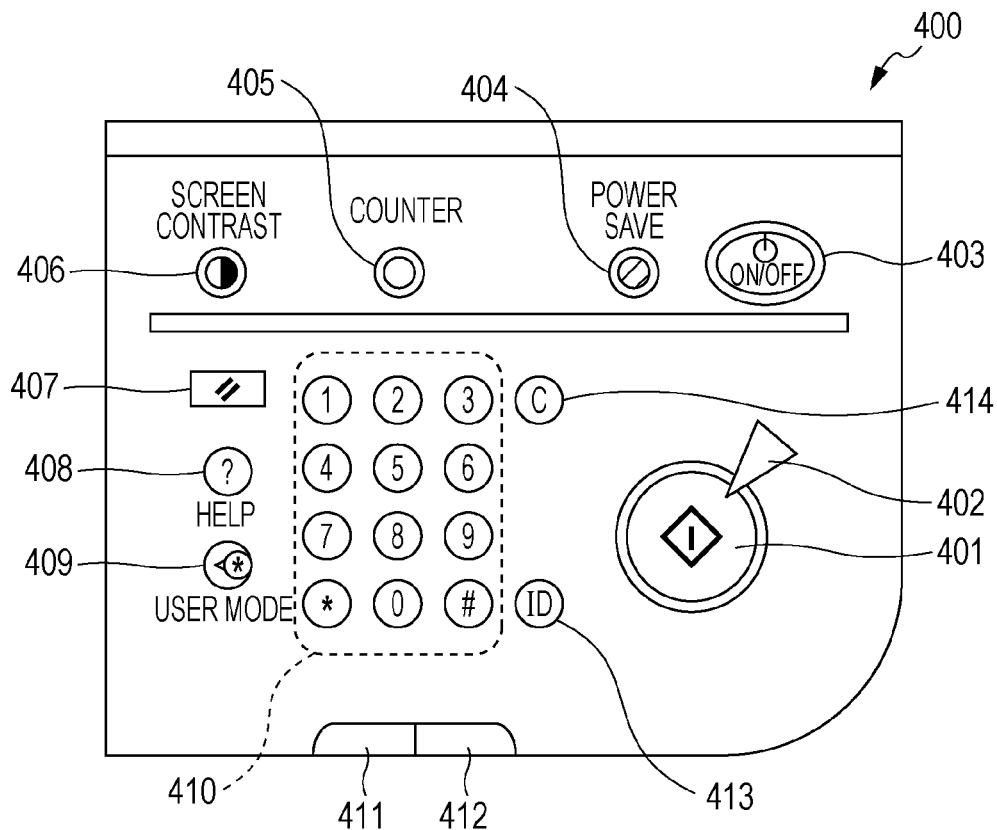
FIGS. 5A and 5B are diagrams illustrating details of an example of an external view configuration of a key input unit and touch panel unit according to the first embodiment of the present invention.
Figure 5B:
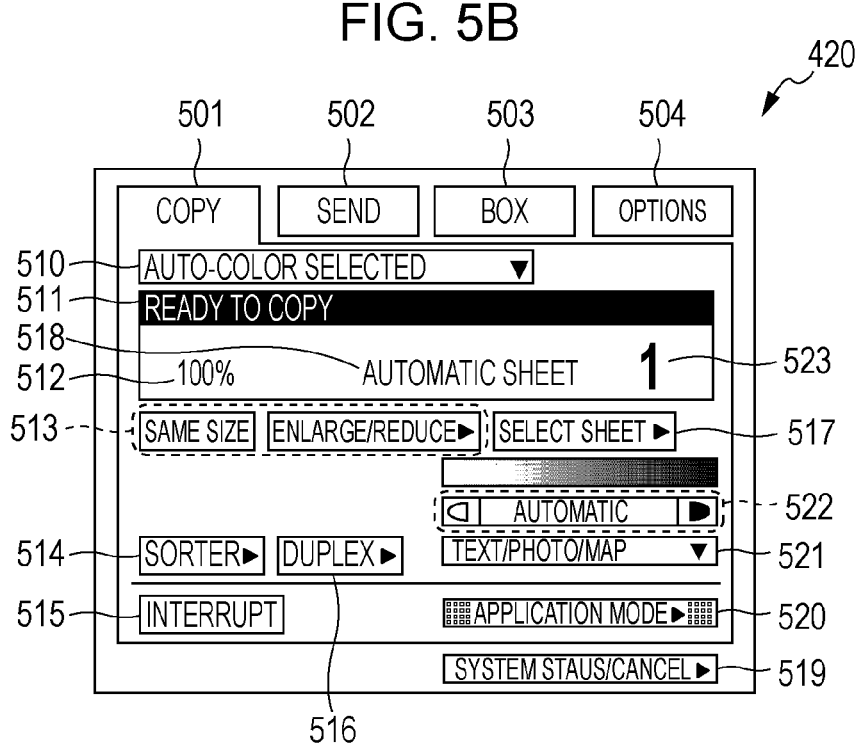

FIGS. 5A and 5B are diagrams illustrating details of an example of an external view configuration of a key input unit (FIG. 5A) and touch panel unit (FIG. 5B). The key input unit 400 shown in FIG. 5A is an input portion of a key that can perform constant operation settings. An operating unit power switch 403 is a switch operated by a user to switch between standby mode and sleep mode. Control based on the operation of an operating power switch 403 can be performed with the main power switch to perform power supply to the entire system of the image forming apparatus 110 is turned ON. A standby mode as defined here is a normal operational state. A sleep mode is a state wherein a controller unit 200 awaits interruption of network printing or facsimile or the like, and is a state that stops the program execution and suppresses power consumption.

A power save key 404 is a key operated by the user to lower the control temperature of a fusing device during standby mode. Upon the power save key 404 operated, time is required until a printable state is reached, but power consumption can be suppressed. Note that the control temperature of the fusing device can also be lowered by setting the power consumption rate.

A start key 401 is operated by the user to instruct the start of copying or transmission or the like, and a stop key 402 is a key operated by the user to instruct interruption of copying or transmission or the like. A numeric keypad 410 is keys operated by the user to provide input numbers for various types of settings of the image forming apparatus 110. A clear key 414 is a key operated by the user to clear the input numbers. An ID key 413 is a key to input a personal identification number set beforehand, in order to authenticate the user of the image forming apparatus 110.

A reset key 407 is a key operated by a user to invalidate the various types of settings of the image forming apparatus 110, and return the settings to a default state. A help key 408 is a key operated by the user to display guidance or help on a touch panel unit 420. A user mode key 409 is a key operated by the user to move to a system setting screen for each user. A counter confirming key 405 is a key operated by the user to display the number of output sheets stored in a software counter that counts the number of printed sheets and so forth provided with the image forming apparatus 110, on a touch panel unit 420. With the image forming apparatus 110 according to the present embodiment, the number of various types of sheets already output can be displayed on the touch panel unit 420, according to operation mode such as copy/print/scan/fax and so forth, color mode such as color/monochrome, paper size such as large/small and so forth.

An image contrast dial 406 is a dial operated by the user to adjust the ease of viewing the screen, such as adjusting the backlighting of a liquid crystal display of the touch panel unit 420. An execute/memory lamp 411 blinks when a job is being executed, or during access to memory, and is a lamp to notify such to the user. An error lamp 412 blinks in the case that a job cannot be executed, or in the case that a service call or the like occurs and an error results, or in the case that an operator call or the like to notify the user of a paper jam or that consumables have run out, and is a lamp to notify such to the user.

The touch panel unit 420 shown in FIG. 5B has an LCD (Liquid Crystal Display) and a "touch panel display having a transparent electrode" which is pasted onto the LCD. Upon a user touching the transparent electrode of the key equivalent portion display on the LCD with a finger, the touch panel unit 420 detects this, and performs various types of display such as displaying a separate operating screen according to the detected content and the content programmed in advance. In FIG. 5B, an example of a screen when the copy tab 501 is shown is illustrated. The touch panel unit 420 can display various types of operating screens according to the setting operations of the user as to the screen therein.

The copy tab 501 is a tab key operated by the user to transfer to an operating screen for copy operations. A send tab 502 is a tab key operated by the user to transfer to an operating screen for Send operations such as sending fax or e-mail. A box tab 503 is a tab key operated by the user to transfer to an operating screen for input/output of a job to a box (storage unit to store jobs for each user). An options tab 504 is a tab key operated by the user to add/set optional functions such as scanner settings, workflow processing functions, and so forth. A system monitor key 519 is a key operated by the user to display the state or status of the image forming apparatus 110. Upon the user selecting each tab, the operation mode of the image forming apparatus 110 can be transferred to the operation mode according to each tab.

The color select setting key 510 is a key operated by the user to select beforehand of color copying, monochrome copying, or automatic selection. An enlarge/reduce setting key 513 is a key operated by the user to transfer to a screen that performs enlarge/reduce settings such as same-size, enlarging, and reducing. A post-processing setting key 514 is a key operated by the user to transfer to a screen that performs settings of whether or not post-processing such as stapling and hole-punching exists, and the counts and locations thereof. A duplex setting key 516 is a key operated by the user to transfer to a screen that selects whether to use simplex printing or duplex printing. A paper size setting key 517 is a key operated by the user to transfer to a screen that selects paper supply tray, paper size, and media type. An image mode setting key 521 is a key operated by the user to transfer to a screen that selects the image mode appropriate to the document image such as text mode or photograph mode. The darkness setting key 522 is a key operated by the user to transfer to a screen that performs adjustments to darken or lighten the output image.

A status display portion 511 is a display portion to perform simple status display such as standby state, warming up, paper jam, error, and so forth. An enlarge/reduce display portion 512 is a display portion to display the amount of enlarging/reducing set with the enlarge/reduce key 513. A paper size display portion 518 is a display portion to display the paper size and mode set with the paper size setting key 517. A number-of-sheets display portion 523 is a display portion to display the number of sheets specified with the numeric keypad 410, or to display which number of sheet is being printed during operation.

Further, an interrupt key 515 is a key operated by the user in the case of interrupting another job during copy operation. An application mode key 520 is a key operated by the user to transfer to a screen performing settings for various types of image processing and layouts, such as continuous pages, cover/facer settings, reduced layout, image movement and so forth.

Figure 6A:
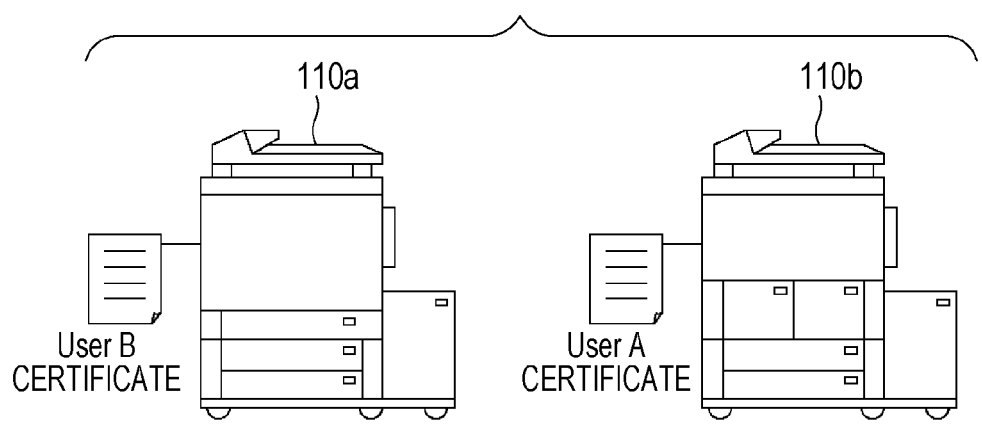
FIG. 6 is a block diagram illustrating an example of workflow definition content and an environment of the image forming apparatus (device) to execute the workflow processing based on such workflow definition according to the first embodiment of the present invention.
Figure 6B:
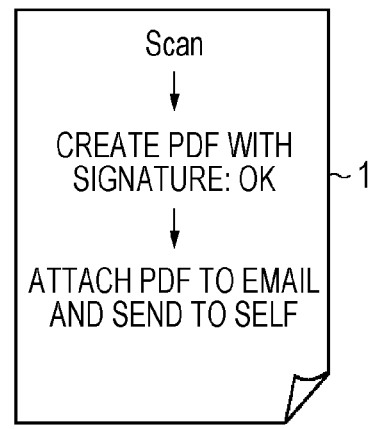

FIG. 6 is a diagram illustrating an example of workflow definition content and an environment of the image forming apparatus (device) to execute the workflow processing based on such workflow definition. According to the present embodiment, processing will be described in detail, exemplifying a case of executing a workflow definition file 1 shown in FIG. 6B, under an environment where two image forming apparatuses 110a and 110b exist, as shown in FIG. 6A. Note that hereafter, the image forming apparatuses 110A and 110b will be called device (1) and device (2) respectively, as needed.

In FIG. 6, the devices (1) and (2) each save the workflow definition file 1 within a workflow definition file information storage unit 321. Also, the devices (1) and (2) both have a Scan function, function for creating PDF with signature, and an email-sending function. The user certificate of User B is registered in the device (1), and the user certificate of User A is registered in the device (2).

Figure 8:
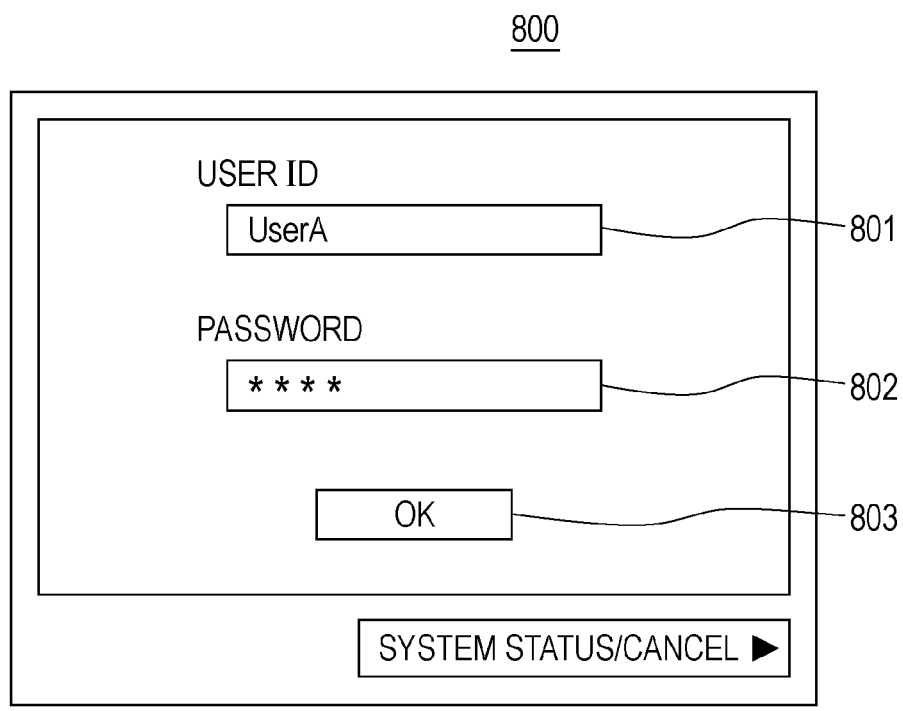
FIG. 8 is a diagram illustrating an example of an authentication screen displayed on the touch panel unit of the device (1) prior to the workflow processing according to the first embodiment of the present invention.

FIG. 7 is a flowchart describing an example of the processing of a device (1) in the event of executing workflow processing based on the workflow definition file 1. FIG. 8 is a diagram illustrating an example of an authentication screen displayed on the touch panel unit 420 of the device (1) (image forming apparatus 110a) prior to the workflow processing.

The user inputs a user ID and password in the "user ID input portion 801 and password input portion 802" displayed on an authentication screen 800 such as shown in FIG. 8, and presses an OK button 803. In step S701, the control unit 312 then sends the user ID and password to the user authentication server 120 via the network processing unit 209. In step S702, the control unit 312 determines whether user authentication has succeeded, based on the information received from the user authentication server 120. Note that any method or protocol to authenticate the user may be used. The processing to authenticate the user is not related to the present invention so detailed description thereof will be omitted.

As a result of the determination therein, in the case that user authentication fails, the processing in the flowchart in FIG. 7 is ended. In the case that user authentication succeeds, the flow is advanced to step S703. Upon the flow advancing to step S703, the control unit 312 stores the authenticated user information in the RAM 202 or the like.

Figures 9, 10:
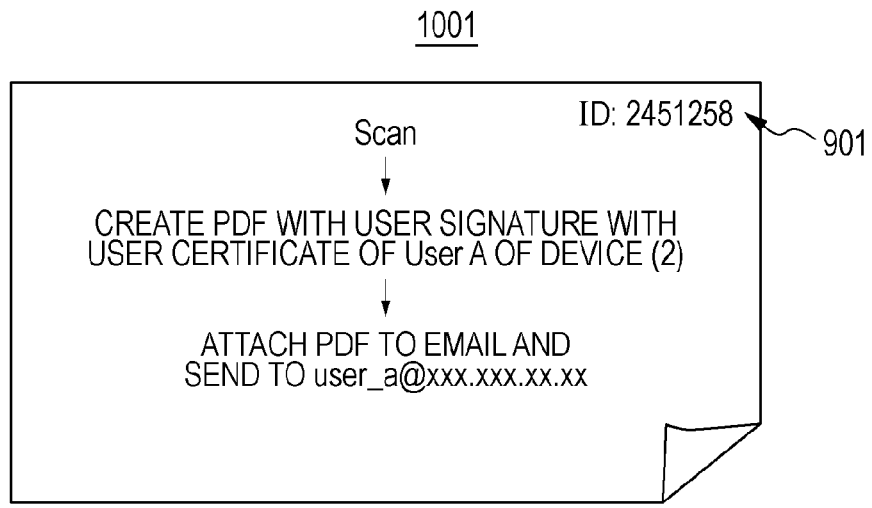
FIG. 9 is a diagram illustrating an example of a management table used to manage user information with a user authentication server according to the first embodiment of the present invention.
FIG. 10 is a diagram conceptually illustrating an example of a workflow definition file according to the first embodiment of the present invention.

FIG. 9 is a diagram illustrating an example of a management table used to manage user information with the user authentication server 120. In the case that user authentication succeeds, the control unit 312 obtains the user e-mail address information as user information and image forming apparatus 110 (device) information wherein the user certificate is held from the user authentication server 120 before the determination in step S702.

Thus, with the present embodiment, an example of setting information is realized with the user information, for example. By executing the processing in step S702 and S703, for example, an example of an obtaining process is realized.

In step S704, the user interface processing unit 311 displays on the touch panel unit 420 a menu of workflow definition file information stored in the workflow definition file information storage unit 321 of the device (1) as to the authenticated user.

In step S705 the user interface processing unit 311 identifies the workflow definition file instructed by the user from the menu of the workflow definition file information displayed in step S704. Description is given as an example of a case wherein the user authenticated with the user ID "User A" instructs execution of the workflow definition file 1.

In step S706, the data input/output unit 315 obtains the workflow definition file identified in step S705 from the workflow definition file information storage unit 321. The workflow definition file wherein the workflow definition file 1 is set is obtained. The workflow definition modifying unit 316 creates a copy of the workflow definition file wherein the workflow definition file 1 is set. Subsequently, the data input/output unit 315 stores the copy of the workflow definition file 1 in the workflow definition temporary file information storage unit 322.

Thus with the present embodiment, an example of copying processing can be realized by performing the processing in step S706.

In step S707, the workflow definition modifying unit 316 generates a unique identifier for the entire workflow processing system, and appends the generated identifier to the workflow definition file 1 created (copied) in step S706.

In step S708, the data analyzing unit 314 and workflow definition modifying unit 316 reflects the user information stored in step S703 to the workflow definition file to which the identifier is appended in step S707, and the workflow definition file is updated. The authenticated user here is User A. As User A information, an e-mail address "user_a@xxx.xxx.xx.xx" and the image forming apparatus "device (2) (IP: XXX.XXX.XXX.XXX)" which has the user certificate are stored in the RAM 202. Also, with the workflow definition file 1, the workflow definition is made up of the three steps of "Scan," "create PDF with user signature," and "attach PDF to e-mail and send to self." The data analyzing unit 314 determines that in order to create a PDF with the user signature, processing with a device which has the user signature is required, and that the address to serve as the sending destination of the e-mail is the e-mail address of the User A. Comprehending the above, the workflow definition modifying unit 316 modifies the workflow definition file 1 shown in FIG. 6B to the workflow definition file 1001 shown in FIG. 10. Thus with the present embodiment, an example of modifying processing can be realized by performing the processing in step S708.

In step S709, the data analyzing unit 314 and workflow definition modifying unit 316 execute the workflow dividing processing to divide the workflow definition file 1001 modified in step S708 into multiple parts. The details of the workflow dividing processing therein will be described later with reference to the flowchart in FIG. 11.

In step S710, the control unit 312 determines whether the workflow processing is executed with the other device (device (2)), based on results in step S709. As a result of the determination therein, in the case that the workflow processing is not executed with the other device, the steps S711 and S712 are skipped and the flow is advanced to the later-described step S713. In the case that the workflow processing is executed with the other device, the flow is advanced to step S711.

Upon the flow advancing to step S711, the control unit 312 sends at least one of the workflow definition files divided in step S709 to the device to execute the workflow based on the workflow definition file, via the network processing unit 209. Of the workflow definition files divided in step S709, the workflow definition file wherein the workflow definition executed with the device (2) is set is sent to the device (2).

Thus with the present embodiment, an example of sending processing can be realized by performing the processing in step S711.

In step S712, the control unit 312 determines whether (device (1)) will execute the workflow processing, based on the results from step S709. As a result of this determination, in the case that the device (1) will not execute the workflow processing, step S713 is skipped, and the processing of the flowchart in FIG. 7 is ended. In the case that the device (1) will execute the workflow processing, the flow is advanced to step S713.

Upon the flow advancing to step S713, the workflow processing executing unit 313 executes the workflow processing according to the workflow definition file wherein the workflow definition executed with the device (1) of the workflow definition files divided in step S709. Specifically, processing is executed to send image data generated with the Scan processing to the device (2) as a workflow job. Note that the workflow processing executing unit 313 appends the same identifier to the workflow job obtained by executing the workflow processing as the identifier generated in step S707. The processing of the flowchart in FIG. 7 is then ended. Thus, with the present embodiment, an example of executing processing can be realized by performing the processing in step S713.

An example of the workflow dividing processing in step S708 will now be described in detail with reference to the flowchart in FIG. 11.

In step S1001, the data analyzing unit 314 selects the steps in the workflow definition file 1001 modified in step S708 in sequence from the beginning. In step S1002, the data analyzing unit 314 identifies one device that can execute the processing for the step selected in step S1001. Note that a case wherein no device exists that can execute the step selected in step S1001 will not be assumed. In other words, description is given here with the assumption that the user cannot select such a workflow definition.

In step S1003 the data analyzing unit 314 inquires as to whether the processing of the step selected in step S1001 can be executed as to the device identified in step S1002. In step S1004, the data analyzing unit 314 determines whether the device identified in step S1002 can execute the processing in the step selected in step S1001, based on the results of the inquiry in step S1003. As a result of this processing, in the case that the device cannot execute the processing, the flow is advanced to the later-described step S1014. In the case that the processing can be executed, the flow is advanced to step S1005.

Upon the flow advancing to step S1005, the data analyzing unit 314 temporarily stores the information of the device identified in step S1002 in the RAM 202 or the like as a candidate for an executable device. In step S1006, the data analyzing unit 314 determines whether there are any other devices identified in step S1002. As a result of the determination therein, in the case where there are other devices, the flow is returned to step S1003. In the case there are no other devices, the flow is advanced to step S1007.

Upon the flow advancing to step S1007, the data analyzing unit 314 determines whether all of the steps in the workflow definition file 1001 modified in step S708 have been selected. As a result of the determination therein, in the case that all of the steps in the workflow definition file 1001 have not been selected, the flow is returned to step S1001, and the next step is selected. In the case that all of the steps in the workflow definition file 1001 are selected, the flow is advanced to step S1008.

In the case that the User A attempts to execute the workflow definition file 1 with the device (1), the determination processing as to each step is executed as described below. In step S1001 the data analyzing unit 314 selects the step of "Scan." In step S1002 the data analyzing unit 314 uses the information to the effect that the Scan processing can be executed with only the device starting the processing as a determination factor, and identifies the device (1). In step S1004 the data analyzing unit 314 determines whether Scanning can be executed with the device (1). Scanning can be performed with the device (1), whereby in step S1005 the data analyzing unit 314 holds the information of the device (1) as a candidate of a device that can execute Scanning.

Only the device (1) is identified therein, and there are unselected steps of the workflow definition file 1. Accordingly, the flow is returned to step S1001 via steps S1006 and S1007, and the data analyzing unit 314 selects the "create PDF with user signature" step. In step S1002 the data analyzing unit 314 uses the information to the effect that the User A certificate exists in the device (2) as a determination factor, and identifies only the device (2). In step S1004 the data analyzing unit 314 determines whether PDF data with a user signature can be created with the device (2). The device (2) can create the PDF data with the user signature of the User A. Therefore, in step S1005, the data analyzing unit 314 stores the information of the device (2) as a candidate of a device that can execute creation of PDF data with the user signature of User A.

Only the device (2) is identified and there are unselected steps in the workflow definition file 1, whereby the flow is returned to step S1001 via the steps S1006 and S1007. The data analyzing unit 314 then selects the "attach PDF to e-mail and send to self" step. In step S1002 the data analyzing unit 314 uses the information to the effect that e-mail can be sent with the devices (1) and (2) as a determination factor, and identifies the devices (1) and (2). In step S1004 the data analyzing unit 314 determines whether the PDF data with user signature can be attached and e-mail sent with the device (1). The device (1) can attach the PDF data with the user signature of User A and send to the address "user_a@xxx.xxx.xx.xx." Therefore, in step S1005 the data analyzing unit 314 stores the information of the device (1) as a candidate of a device that can execute attaching PDF data with the user signature of the User A and send an e-mail.

The device (2) is also identified in addition to the device (1), so the flow returns from step S1006 to step S1003. In step S1005 the data analyzing unit 314 also stores the information of the device (2) as a candidate of a device that can execute attaching PDF data with the user signature of the User A and send an e-mail.

Thus, in step S1007, if determination is made that there are no more unselected steps in the workflow definition file 1, the flow is advanced to step S1008.

Upon the flow advancing to step S1008, the workflow definition modifying unit 316 uses the checked results through step S1007 to create a "candidate for executable device" in each step of the workflow definition file 1. With the above-described example, the next candidate is created as "candidate for executable device" in each step of "Scan," "create PDF with user signature," and "attach PDF to e-mail and send to self." That is to say, a combination of "device (1)-device (2)-device (1)" and a combination of "device (1)-device (2)-device (2)" are created.

Upon the flow advancing to step S1009, the workflow definition modifying unit 316 checks how many times the devices to execute the workflow processing have been modified, based on the candidates created in step S1008. The workflow definition modifying unit 316 identifies a combination with the fewest divisions of the workflow definition file, from the candidates created in step S1008 based on the check results. With the above-described example, the combination of "device (1)-device (2)-device (2)" is identified.

In step S1010 the workflow definition modifying unit 316 determines whether the candidate identified in step S1009 is made up of one device instead of a combination of devices. As a result of the determination thereof, in the case that the candidate identified in step S1009 is made up of one device, the steps S1011 through S1013 are skipped and the processing of the flowchart in FIG. 11 is ended, and the flow is advanced to step S710 in FIG. 7. In the case that the candidate identified in step S1009 is made up of a combination of devices, the flow is advanced to step S1011.

Note that in the case of assuming that processing of at least one step of the workflow definition can be executed with the device (device (1)) that the user has instructed to execute the workflow, a determination such as the following may be performed in step S1010. That is to say, the workflow definition modifying unit 316 may determine whether a device other than the device (1) is included in the candidates identified in step S1009. As a result of the determination therein, in the case that a device other than the device (1) is included in the candidates identified in step S1009, the flow is advanced to step S1011, and in the case of not being included, the flow is advanced to step S710 in FIG. 7. In other words, in the case that there is a step in the workflow definition that cannot be executed with the device (1), the flow is advanced to step S1011, and otherwise the flow is advanced to step S710 in FIG. 7. In such a case, with the present embodiment, for example by executing the processing in step S1009, an example of a third determination process is realized.

Upon the flow advancing to step S1011, the workflow definition modifying unit 316 divides the workflow definition in the workflow definition file 1 at modification locations of the device executing the workflow processing, based on the combination identified in step S1009. Thus, the workflow definition file wherein the workflow definition file 1 has been set is divided into multiple workflow definition files for each device that executes the workflow processing (multiple files are generated). Note that for each of the divided workflow definition files, an identifier generated in step S707 in FIG. 7 is attached. Note that with the present embodiment, an identifier is generated with the step S707 in FIG. 7, but for example, an identifier may be generated after step S1011.

Thus with the present embodiment, an example of dividing processing can be realized by performing the processing in steps S1008 through S1011.

Figure 12A:
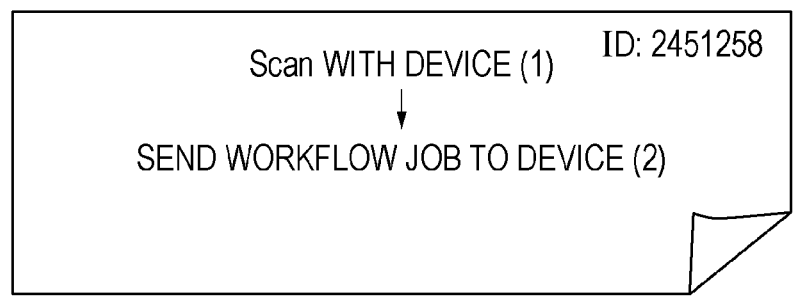
FIGS. 12A and 12B are diagrams conceptually illustrating an example of a workflow definition file after updating according to the first embodiment of the present invention.
Figure 12B:

In step S1012, the workflow definition modifying unit 316 adds a send/receive processing to mutually link the workflow definition files divided in step S1011 to the workflow definition file therein and updates the workflow definition file. Thus, the processing based on the divided workflow definition is linked. FIGS. 12A and 12B are diagrams conceptually illustrating an example of a workflow definition file after updating. FIG. 12A shows an example of the workflow definition file 1201 executed with the device (1), and FIG. 12B shows an example of a workflow definition file 1202 executed with the device (1). Thus with the present embodiment, for example, an example of adding processing can be realized by performing the processing in step S1012.

In step S1013, the workflow definition modifying unit 316 appends the identifier appended in step S706 to each of the post-division workflow definition files updated in step S1012. Thus, the same identifier as the identifier appended to the workflow definition file before division is appended as a shared identifier to each of the post-division workflow definition files. The processing of the flowchart in FIG. 11 is then ended and the flow is advanced to step S710 in FIG. 7. Thus with the present embodiment, an example of setting processing can be realized by performing the processing in step S1013.

In step S1004, upon determination being made that the device identified in step S1002 cannot execute the processing in the step selected in step S1001, the flow is advanced to step S1014. Upon advancing to step S1014, the data analysis unit 314 determines whether or not there are any other devices identified in step S1002. As a result of the determination therein, in the case there is such a device, the flow is returned to step S1003. In the case there is no such device, the flow is advanced to step S1015. Upon the flow advancing to step S1015, the data analyzing unit 314 notifies the user that the workflow processing cannot be executed, by display of an image on the touch panel unit 420 showing that the workflow processing cannot be executed. In this case, the flow is ended as an error. Thus, with the present embodiment, an example of a second determining unit can be realized by performing the processing in steps S1004 and S1014.

An example of processing with the device (2) in the event of executing the workflow processing based on the workflow definition file 1 will be described with reference to the flowchart in FIG. 13.

In step S1201, the control unit 312 obtains the workflow definition file transmitted from the device (1) in step S711 in FIG. 7, via the network processing unit 209. The data input/output unit 315 saves the workflow definition file in the workflow definition temporary file information storage unit 322.

In step S1202 the control unit 312 awaits until the workflow job sent from the device (1) is received with the network processing unit 209. The workflow job therein is obtained by the workflow processing being executed in step S711 in FIG. 7. Upon the workflow job reception being detected, the flow is advanced to step S1203. Upon the flow advancing to step S1203, the data analyzing unit 314 obtains the identifier from the received workflow job.

In step S1204 the data analyzing unit 314 determines whether the workflow definition file including the same identifier as the identifier obtained in step S1203 exists in the workflow definition temporary file information storage unit 322. As a result of the determination therein, in the case there is a workflow definition file including the same identifier as the identifier obtained in step S1203, the flow is advanced to step S1205. Upon the flow advancing to step S1205, the workflow processing executing unit 313 executes the workflow processing according to the workflow definition set in the workflow definition file including the same identifier as the identifier obtained in step S1203. The processing with the flowchart in FIG. 13 is then ended.

In the case there is no workflow definition file including the same identifier as the identifier obtained in step S1203, the flow is advanced to step S1206. Upon the flow advancing to step S1206, the control unit 312 notifies information as to the device (1) which is the sending source of the workflow job, to the effect that processing cannot performed. The processing with the flowchart in FIG. 13 is then ended.

Note that with the above-described specific example, a case is described wherein the User A attempts to cause the device (1) to execute the workflow definition file 1. However, by performing the same processing as the processing shown in FIGS. 7, 11, and 13, the User A can also execute the workflow definition file 1 with the device (2). In this case, in step S1008 in FIG. 11, the following combination is created as "candidate for executable device" in each step of "Scan," "create PDF with user signature with user certificate," and "attach PDF to e-mail and send to self." That is to say, "device (2)-device (2)-device (1)" and a combination of "device (2)-device (2)-device (2)" are created.

In step S1009, "device (2)-device (2)-device (2)" is identified. In this case, a combination executed with all device (2) is used, whereby in step S1010 determination is made that the candidate has only one device. Therefore, the processing in steps S1011 through S1013 is not performed. Further, there is no divided workflow definition, whereby the flow is advanced from step S710 to step S713 and all workflow processing is executed, and the processing is ended.

Thus, with the present embodiment, the device (image forming apparatus 110) obtains the user information instructing execution of the workflow definition from the user authentication server 120, and modifies the workflow definition so that the user information thereof is reflected. The modified workflow definition is then separated at the locations wherein the devices executing the workflow processing changes and divided into multiples and stores individually in multiple files, whereby the workflow definition is divided for each workflow executing apparatus. Further, in order to mutually link the multiple divided workflow definitions, the multiple workflow definitions are supplemented. The image forming apparatus 110 executes the workflow processing according to the multiple workflow definitions thus obtained.

Accordingly, at the time of executing the workflow processing, the execution content of the workflow definition file can be appropriately determined and updated according to information set by the user or information of device capability. Thus, assuming all patterns in the case of each user executing workflow definitions with each device and preparing workflow definitions becomes unnecessary. Accordingly, in the event of collaboratively executing the workflow processing with multiple devices, even if the user settings are not performed for each device, the workflow processing can be executed according to the settings by the user. Also, even in a case wherein the functions of the executable devices differ by user, the processing of the workflow is executed in accordance with the settings by the user. Thus, with the present embodiment, regardless of which device the user instructs workflow execution, multiple devices can reflect individual user settings, and collaboratively execute workflow processing.

Further, even in the case of a user having modified the settings, the original workflow definition file is not modified, whereby maintenance is simple. Also, the original workflow definition file can be updated regardless of the setting information and the like of each user, whereby maintenance becomes simple, and conflicts of workflow definition files between users are less likely to occur.

Also, with the present embodiment, in the event that the workflow definition is divided, the number of times that the image forming apparatus 110 that executes the workflow processing is reduced, whereby workflow processing can be performed efficiently.

Figure 11:
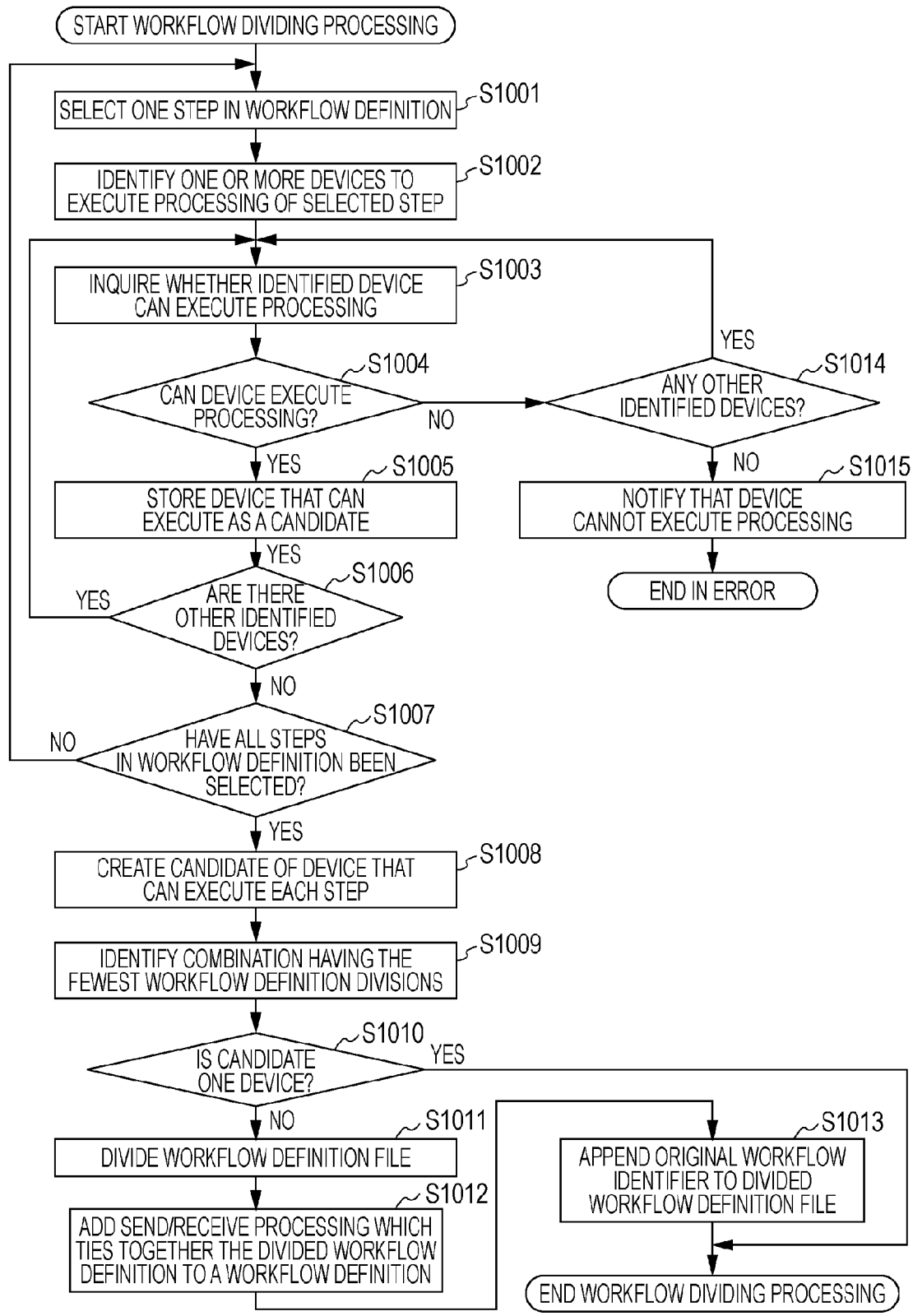
FIG. 11 is a flowchart describing in detail an example of workflow dividing processing according to the first embodiment of the present invention.

Note that with the present embodiment, description is given with the prerequisite that the device execution capability is not understood, whereby whether or not the processing for each step of the workflow definition can be executed is inquired of the device (step S1003 in FIG. 11). However, this is not necessarily required. For example, each device can understand the capabilities of the other devices from the beginning so as to not perform such inquiries.

Also, with the present embodiment, description is given with an example of a case wherein the data transmission/reception between devices is supplemented as a workflow processing to mutually link the divided workflow definition (step S1011 in FIG. 11). However, the content for supplementing is not limited to this. For example, a supplementing processing to notify the device of the request source of the processing results after processing is completed may be added.

Further, with the present embodiment, after dividing the workflow definition, before executing the workflow processing (step S711 in FIG. 7), the divided workflow definition is sent to the device executing the workflow processing according to the workflow definition. However, the timing to send the workflow definition is not limited to this. For example, the workflow definition may be sent to the device together with the workflow job at the timing to send the workflow job.

Note that with the present embodiment, a case is assumed wherein there are no devices that can execute the processing of a step when one or more devices that can execute the processing of such step selected in step S1001 are identified in step S1002 in FIG. 11. That is to say, checking the workflow beforehand and so forth is assumed.

For example, in the case that the information of the device holding the user certificate of the relevant user cannot be obtained as user information in step S703 in FIG. 7, the following should be performed. That is to say, at the time of executing step S704, the workflow definition to use the user certificate should be deleted from the menu of the workflow definition presented to the user. For example, in the environment shown in FIG. 6, in the case that User C is authenticated, the workflow definition using the user certificate of the User C is deleted from a menu of the workflow definitions presented to User C. Additionally, in step S708, in the event of reflecting the user information to the copied workflow definition, determination may be made that there is no information to reflect, resulting in an error. Also, a workflow starting with Scan can be made to be non-applicable to a device that does not have a Scan function (scanner function). Further, a workflow definition starting with Scan may be deleted from the menu of the workflow definition, or an error may occur in the event of reflecting the user information to the copied workflow definition.

Thus, the workflow definition that cannot be processed is determined before dividing the workflow definition, and by causing this to be an error or the like, unnecessary processing can be eliminated.

Also, with the present embodiment, in step S708 the workflow definition is modified using the user information stored in step S703 (see FIG. 10), but the following may be performed. That is to say, in addition to user information, information relating to the capability of the devices (1) and (2) may be used. In such a case, before performing the processing in step S708, the information relating to the capability of the device may be obtained from the device or server.

Also, the user information is not limited to that shown in FIG. 9. The user information may include at least one of the information to identify the device wherein settings are performed by the user and information to identify the device that is set as that which the user normally uses.

The present embodiment enables multiple workflow executing apparatuses to collaboratively execute workflow processing according to settings by users. Additionally, the present embodiment also provides for modifying the workflow definition to match the user settings, and dividing the changed workflow definition to match the apparatus to execute the workflow definition. Accordingly, workflow processing can be executed by multiple workflow executing apparatuses collaborating, according to user settings.

A second embodiment according to the present invention will now be described. With the above-described first embodiment, the workflow definition file is divided, and the divided workflow definitions are individually stored in multiple files. With the present embodiment, the workflow definition is divided without dividing the workflow definition file. Thus the present embodiment and the above-described first embodiment differ primarily in one example of processing in the event of dividing the workflow definition. Accordingly, with the description of the present embodiment, the portions which are the same as the first embodiment will use the same reference numerals as the reference numerals used in FIGS. 1 through 13 and so forth, and detailed description thereof will be omitted.

Figure 14A:
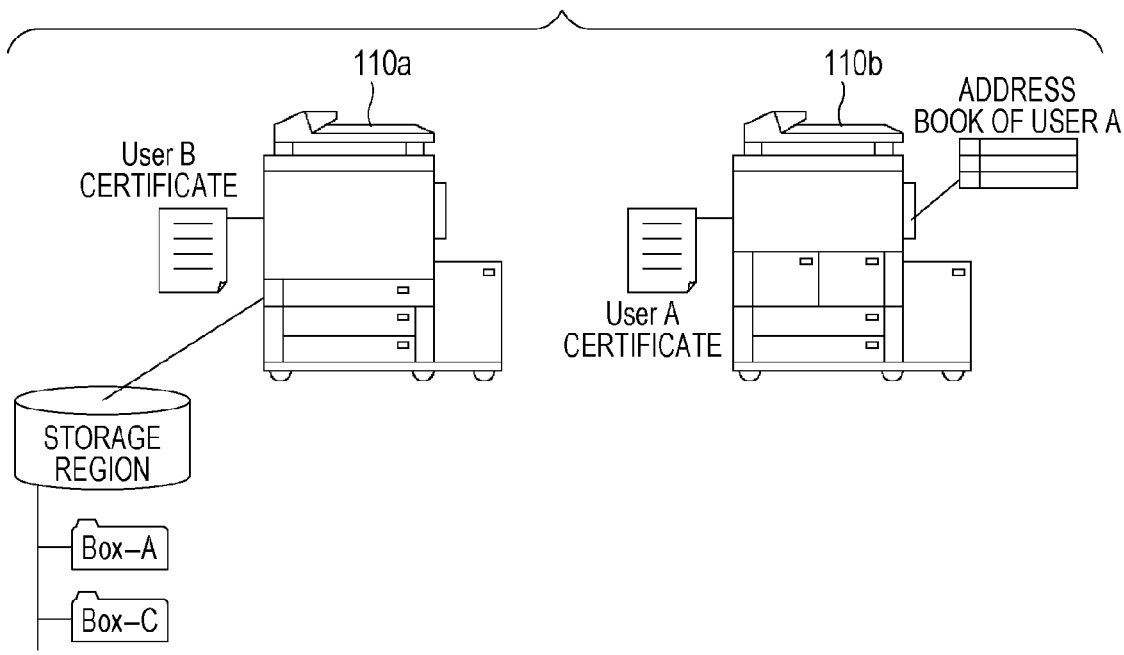
FIGS. 14A and 14B are block diagrams illustrating an example of workflow definition content and an environment of the image forming apparatus (device) to execute the workflow processing based on such workflow definition according to a second embodiment of the present invention.
Figure 14B:
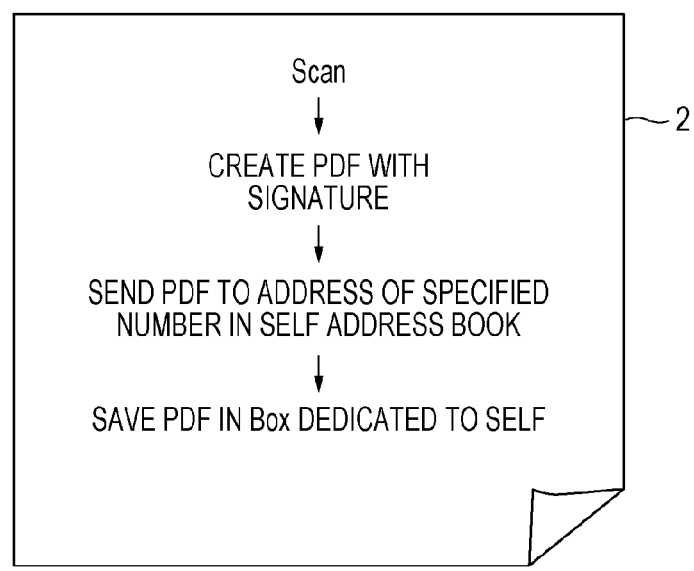

FIGS. 14A and 14B are block diagrams illustrating an example of workflow definition content and an environment of the image forming apparatus (device) to execute the workflow processing based on such workflow definition. With the present embodiment, as shown in FIG. 14A, processing will be described in detail with an example wherein a workflow definition file 2 as shown in FIG. 14B is executed in an environment where two image forming apparatuses 110a and 110b exist, as shown in FIG. 14A. Note that hereafter, the image forming apparatuses 110a and 110b will be called device (1) and device (2) respectively, as needed. Also, FIG. 15 is a diagram illustrating an example of a management table used to manage user information with a user authentication server. With the present embodiment, an example of setting information can be realized with the user information therein. Note that with the present embodiment also, the user information is not limited to that shown in FIG. 15. The user information may include at least one of the information to identify the device wherein settings are performed by the user and information to identify the device that is set as that which the user normally uses.

In FIG. 15, a user-dedicated storage region for User A is a Box called Box-A of the device (1) and a user-dedicated address book for User A is an address book called A of the device (2). This information is managed in the management table as the user information. The Box-A which is held in the device (1) can execute saving of data directly from any device. Also, address data of the address book A can be reference from any device. However, the processing to use address to send can only be executed with the device wherein the address book exists.

Figure 16:
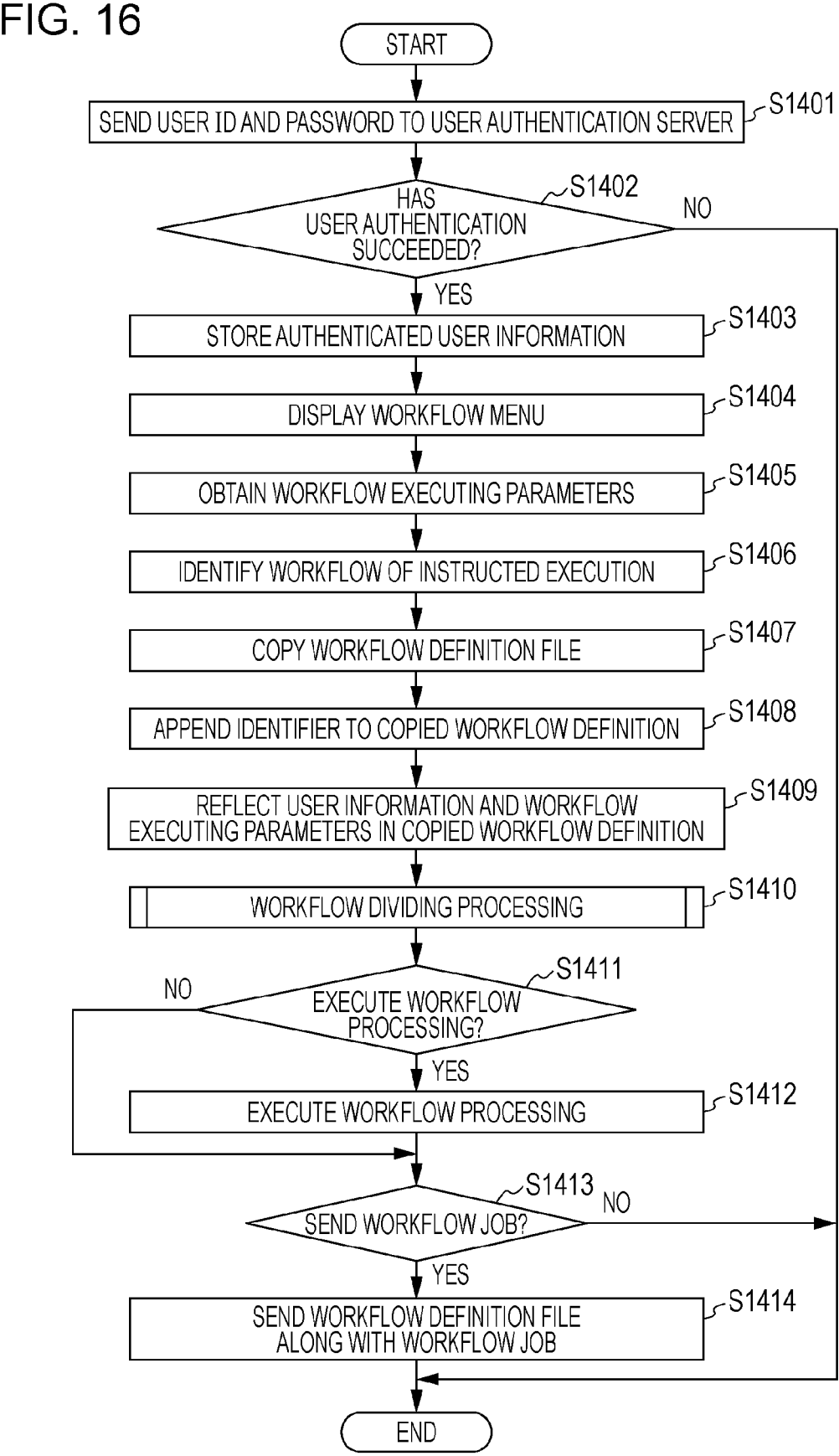
FIG. 16 is a flowchart describing an example of processing of a device (1) in the event of executing workflow processing based on the workflow definition file according to a second embodiment of the present invention.

An example of the processing of the device (1) in the event of executing the workflow processing based on the workflow definition file 2 is described with reference to the flowchart in FIG. 16. In FIG. 16, processing for steps S1401 through S1404 are performed in the same way as the steps S701 through S704 in FIG. 7, and a menu of information of the workflow definition file saved in the workflow definition file information storage unit 321 is displayed on the touch panel unit 420. Thus with the present embodiment, for example, by executing the processing in steps S1402 and S1403, an example of obtaining processing is realized.

In step S1405, when parameters used for execution of the workflow are specified by the user from a menu of workflow definition information, the user interface processing unit 311 obtains the parameters thereof. For example, when the User A specified the workflow definition file 2 from the menu of workflow definition file information, an e-mail with PDF data attached thereto is sent to the fourth address of the address book A of User A. In this case, the number four of the address book A of User A is the parameter. Thus with the present embodiment, an example of setting information is realized with the parameter information therein. Note that the setting information may be realized with only the parameter information therein.

In step S1406, the user interface processing unit 311 identifies the workflow definition file instructed by the user from a menu of workflow definition file information. The User A instructs the execution of the workflow definition file 2 in this example, whereby the workflow definition file 2 is identified.

In step S1407, the data input/output unit 315 obtains the workflow definition file 2 identified in step S1406 from the workflow definition file information storage unit 321. The workflow definition modifying unit 316 creates a copy of the workflow definition file wherein the workflow definition file 2 is set. Subsequently, the data input/output unit 315 stores the copy of the workflow definition file 2 in the workflow definition temporary file information storage unit 322. Thus, with the present embodiment, an example of copying processing is realized by performing the processing in step S1407.

Figure 17:
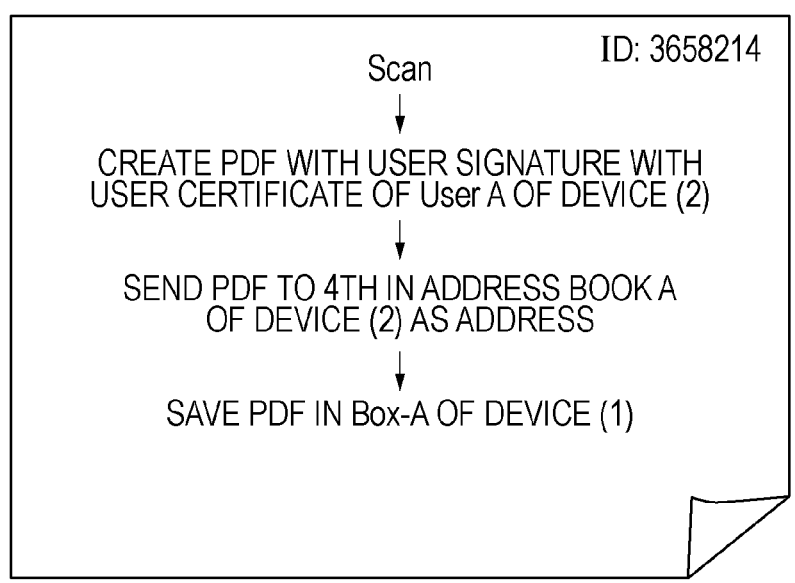
FIG. 17 is a diagram illustrating an example of a workflow definition file modified to reflect user information and workflow execution parameters according to a second embodiment of the present invention.

In step S1408, the workflow definition modifying unit 316 generates a unique identifier for the entire workflow processing system, and appends the generated identifier to the workflow definition file 2 created (copied) in step S1407. In step S1409 the data analyzing unit 314 and workflow definition modifying unit 316 update the workflow definition file. With the present embodiment, the user information stored in step S1403 and the workflow execution parameters obtained in step S1405 are reflected to the workflow definition file. FIG. 17 is a diagram illustrating an example of a workflow definition file 1701 modified to reflect user information and workflow execution parameters. Thus, with the present embodiment, an example of updating processing is realized by performing the processing in step S1409.

In step S1410, the data analyzing unit 314 and workflow definition modifying unit 316 executes the workflow dividing processing to divide the workflow definition file 1701 changed in step S1409 into multiple processings. The details of the workflow dividing processing will be described later with reference to the flowchart in FIG. 18.

In step S1411 the control unit 312 determines whether (device (1)) will execute the workflow processing, based on the results from step S1410. As a result of this determination, in the case that the device (1) will not execute the workflow processing, step S1412 is skipped, and the flow is advanced to the later-described step S1413. In the case that the device (1) itself will execute the workflow processing, the flow is advanced to step S1412.

In step S1412, the workflow processing executing unit 313 executes the workflow processing according to the workflow definition file wherein the workflow definition is executed with the device (1) of the workflow definition files divided in step S1410. The workflow processing executing unit 313 appends the same identifier to the workflow job attribute obtained by executing the workflow processing as the identifier generated in step S1408. Thus, with the present embodiment, an example of executing processing is realized by performing the processing in step S1412.

In step S1413, the data analyzing unit 314 determines whether to send the workflow job, based on the workflow definition obtained in step S1410. As a result of the determination therein, in the case of not sending the workflow job, the processing of the flowchart in FIG. 16 is ended. In the case of sending the workflow job, the flow is advanced to step S1414. Upon advancing the flow to step S1414, the control unit 312 sends the workflow job to a device which is the sending destination of the workflow job, along with the workflow definition file which includes the multiple workflow definitions divided in step S1410. The processing in the flowchart in FIG. 16 is then ended. Thus, with the present embodiment, an example of executing processing is realized by performing the processing in step S1414.

Figure 18:
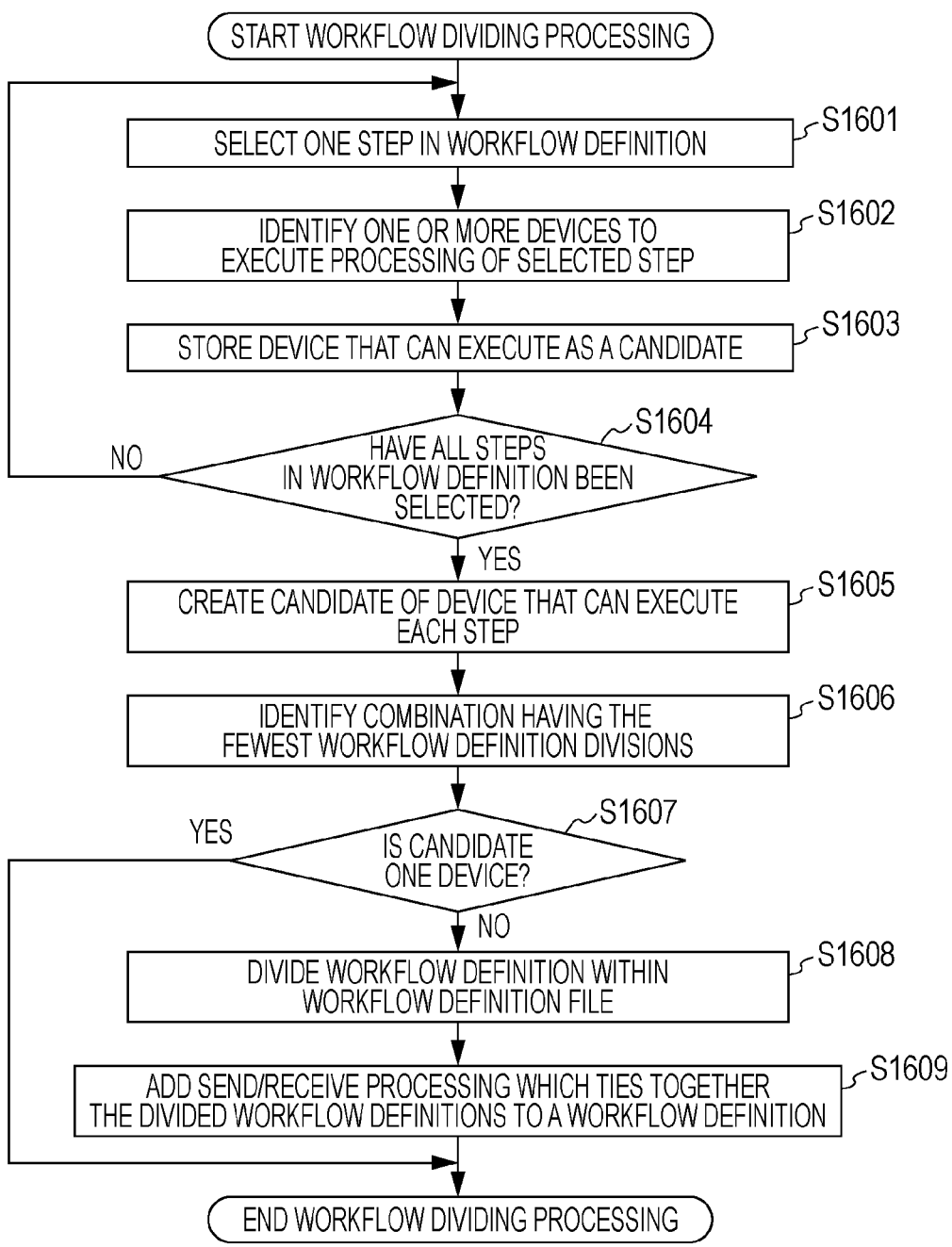
FIG. 18 is a flowchart describing in detail an example of workflow division processing according to a second embodiment of the present invention.

An example of the workflow dividing processing in step S1410 will now be described in detail with reference to the flowchart in FIG. 18. With the present embodiment, an example which differs from the first embodiment is given with a case wherein each device obtains and understands beforehand the capability of other devices to execute.

In step S1601 the data analyzing unit 314 selects the steps in the workflow definition file 1701 modified in step S1409 in sequence from the beginning. In step S1602, the data analyzing unit 314 identifies one device that can execute the processing for the step selected in step S1601.

In step S1603 the data analyzing unit 314 stores the information of the device identified in step S1602 in the RAM 202 or the like as a candidate for an executable device. In step S1604, the data analyzing unit 314 determines whether all of the steps in the workflow definition file 1701 modified in step S409 have been selected. As a result of the determination therein, in the case that all of the steps in the workflow definition file 1701 have not been selected, the flow is returned to step S1601, and the next step is selected. In the case that all of the steps in the workflow definition file 1701 are selected, the flow is advanced to step S1605.

Upon the flow advancing to step S1605, the workflow definition modifying unit 316 uses the checked results through step S1604 to create a "candidate for executable device" in each step of the workflow definition file 2. With the above-described example, the next candidate is created as "candidate for executable device" in each step of "Scan," "create PDF with user signature," "send PDF to address of number specified in self address book," and "save PDF in Box dedicated for self." That is to say, a combination of "device (1)-device (2)-device (2)-device (1)" and a combination of "device (1)-device (2)-device (2)-device (2)" are created.

Upon the flow advancing to step S1606, the workflow definition modifying unit 316 identifies a candidate with the fewest divisions of the workflow definition, from the candidates created in step S1605. With the above-described example, the combination of "device (1)-device (2)-device (2)-device (2)" is identified.

In step S1607 the workflow definition modifying unit 316 determines whether the candidate identified in step S1606 is made up of one device instead of a combination of devices. As a result of the determination thereof, in the case that the candidate identified in step S1606 is made up of one device, the steps S1608 through S1609 are skipped and the processing of the flowchart in FIG. 16 is ended, and the flow is advanced to step S1411 in FIG. 16. In the case that the candidate identified in step S1606 is made up of a combination of devices, the flow is advanced to step S1608.

Upon the flow advancing to step S1608, the workflow definition modifying unit 316 divides the workflow definition in the workflow definition file. With the present embodiment, the workflow definition file is not divided as files, but rather the workflow definition is divided with the workflow definition file at modification locations of the device executing the workflow processing, based on the combination identified in step S1607. Thus, with the present embodiment, an example of dividing processing is realized by performing the processing in steps S1605 through S1608.

In step S1609, the workflow definition modifying unit 316 adds a send/receive processing to mutually link the workflow definitions divided in step S1608 to the workflow definition therein and updates the workflow definition file. Thus, the processing based on the divided workflow definition is linked. The processing of the flowchart in FIG. 18 is ended and the flow is advanced to step S1411 in FIG. 16. Thus, with the present embodiment, an example of adding processing is realized by performing the processing in step S1609.

Figure 19:
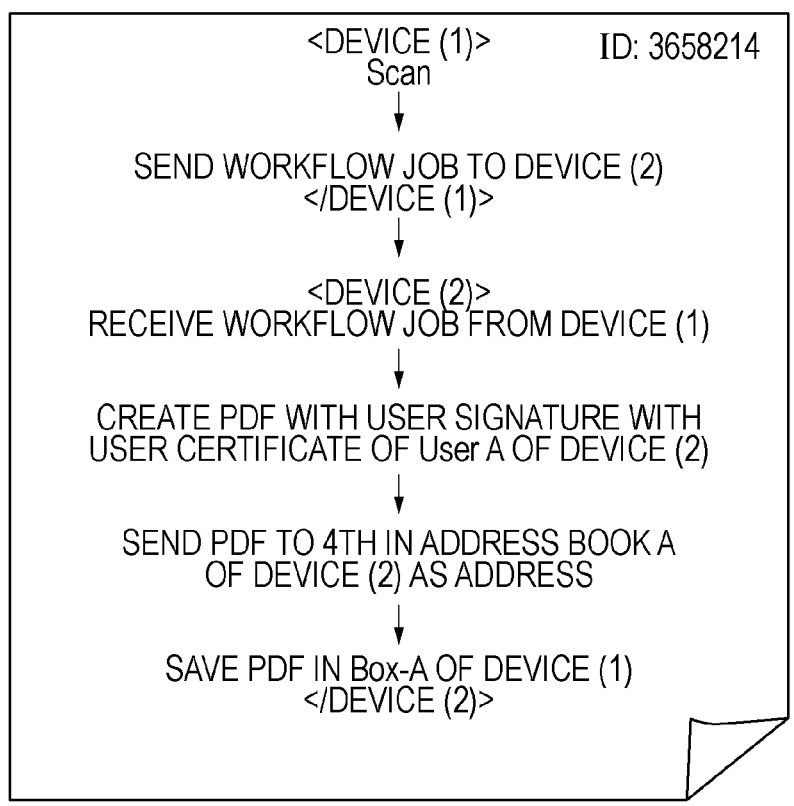
FIG. 19 is a diagram conceptually illustrating an example of a workflow definition file after updating according to a second embodiment of the present invention.

FIG. 19 is a diagram conceptually illustrating an example of a workflow definition file 1901 after updating.

Figure 20:
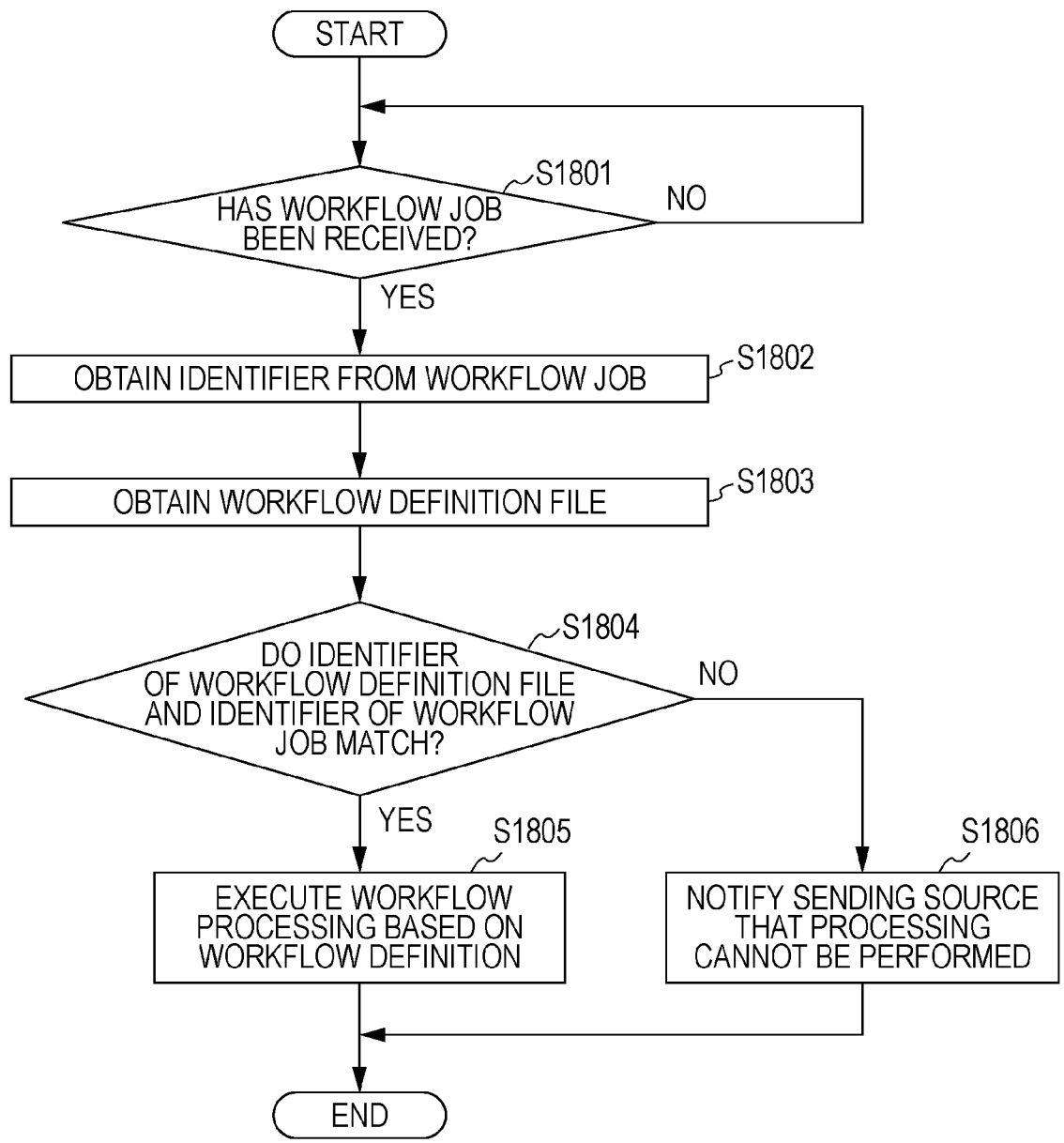
FIG. 20 is a flowchart describing an example of the processing of a device (2) in the event of executing workflow processing based on the workflow definition file according to a second embodiment of the present invention.

An example of processing of the device (2) in the event of executing the workflow processing based on the workflow definition file 2 will be described with reference to the flowchart in FIG. 20.

In step S1801, the control unit 312 awaits until the workflow job sent from the device (1) in step S1413 in FIG. 16 is received with the network processing unit 209. Upon the workflow job being received, the flow is advanced to step S1802.

In step S1802, the data analyzing unit 314 obtains the identifier from the received workflow job. In step S1803 the control unit 312 obtains the workflow definition file received at the same time as the workflow job.

In step S1804 the data analyzing unit 314 determines whether the identifier of the workflow definition file obtained in step S1803 and the identifier obtained in step S1802 match. As a result of the determination therein, in the case that the identifiers match, the flow is advanced to step S1805. Upon the flow advancing to step S1805, the workflow processing executing unit 313 extracts the workflow definition to be executed with the device (2) from the workflow definition file obtained in step S1803, and executes the workflow processing according to the extracted workflow definition. The processing of the flowchart in FIG. 20 is then ended.

In the case that the identifiers do not match, the flow is advanced to step S1806. Upon the flow advancing to step S1806, the control unit 312 notifies the device (1) which is the transmission source of the workflow job that processing cannot be performed. The processing of the flowchart in FIG. 20 is then ended.

Thus, with the present embodiment, a device modifies the workflow definition such that in addition to information stored in the management table of the user authentication server 120 as information of the user instructing execution of the workflow definition, information of the workflow setting parameters are reflected therein. The modified workflow definition is then divided at locations where devices executing the workflow processing are modified, within the workflow definition file. Accordingly, in addition to the advantages described in the first embodiment, an advantage can be obtained such that workflow processing can be performed without dividing the workflow definition file into multiple files and creating multiple temporary files.

If a temporary file is sent before the workflow job as with the first embodiment, for example in the case that the workflow processing stops during the processing, or in the case that the workflow processing is cancelled during the processing, multiple temporary files have to be searched and deleted. Conversely, with the present embodiment, by setting the temporary workflow definition file to one file only without dividing the workflow definition file, the workflow definition file can be readily deleted according to the state of workflow processing.

Note that with the present embodiment, an example is described of a case to obtain parameters used for execution of the workflow based on input operations of the device by the user, but this is not necessarily required. For example, parameters may be stored as user information in a management table of the user authentication server, and the parameters thereof are obtained. Also, using identifiers to manage the workflow definition and workflow job in a sure manner, as with the present embodiment, is desirable. However, with the present embodiment the workflow definition and workflow job are sent together, whereby the user of identifiers is not necessarily required. Also, with the present embodiment, various modifications described in the first embodiment may be implemented.

A third embodiment according to the present invention will be described. With the above-described first and second embodiments, examples are given of a case wherein in the event of dividing the workflow definition only one combination of devices having the fewest divisions of the workflow definition is used. With the present embodiment, an example is described in the case that there may be two or more combinations of devices having the fewest divisions of the workflow definition. Thus the present embodiment and the above-described first and second embodiments primarily differ in one part of the processing in the event of dividing the workflow definition. Accordingly, with the description of the present embodiment, the portions which are the same as the above-described first and second embodiments will use the same reference numerals as the reference numerals used in FIGS. 1 through 20 and so forth, and detailed description thereof will be omitted.

Figure 21A:
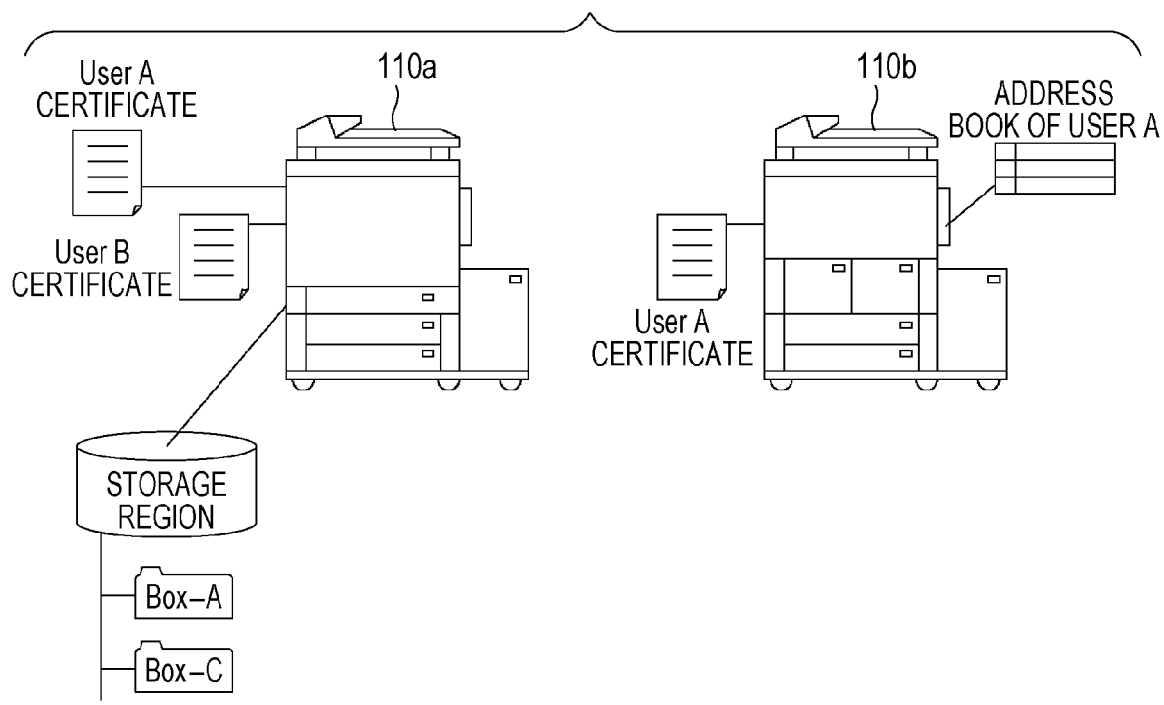
FIGS. 21A and 21B are diagrams illustrating an example of workflow definition content and an environment of the image forming apparatus (device) to execute the workflow processing based on such workflow definition according to a third embodiment of the present invention.
Figure 21B:
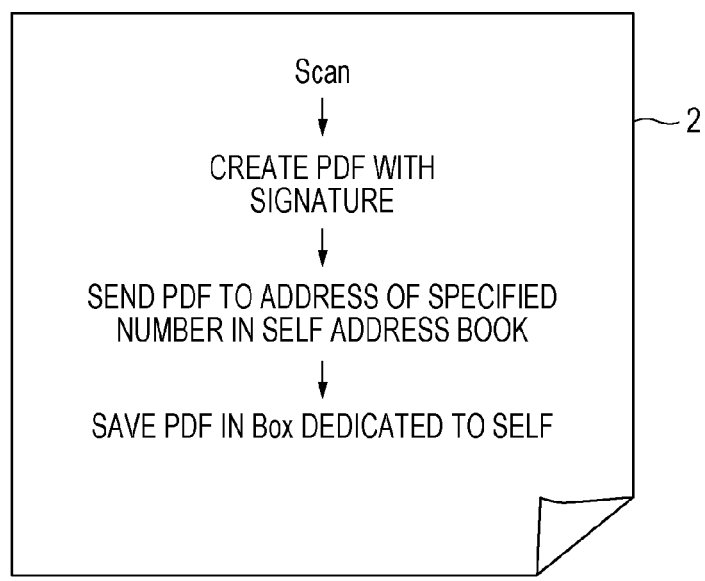

FIGS. 21A and 21B are diagrams illustrating an example of workflow definition content and an environment of the image forming apparatus (device) to execute the workflow processing based on such workflow definition. With the present embodiment, as shown in FIG. 21A, processing will be described in detail with an example wherein a workflow definition file 2 as shown in FIG. 21B is executed in an environment where two image forming apparatuses 110a and 110b exist. Note that hereafter, the image forming apparatuses 110a and 110b will be called device (1) and device (2) respectively, as needed. Also, FIG. 22 is a diagram illustrating an example of a management table used to manage user information with the user authentication server 120.

In the environment shown in FIG. 21A, the device (1) holds the certificate of the User A in addition to the certificate of the User B, and both of the devices (1) and (2) hold the certificate of the User A. Except for this point, the environment shown in FIG. 21A and the environment shown in FIG. 14A are the same. Also, with the management table shown in FIG. 22, the device holding the user certificate of the User A is both device (1) and device (2). Other than this, the management table shown in FIG. 22 and the management table shown in FIG. 15 are the same. With the present embodiment, an example of setting information is realized with the user information shown in FIG. 22.

Figure 23:
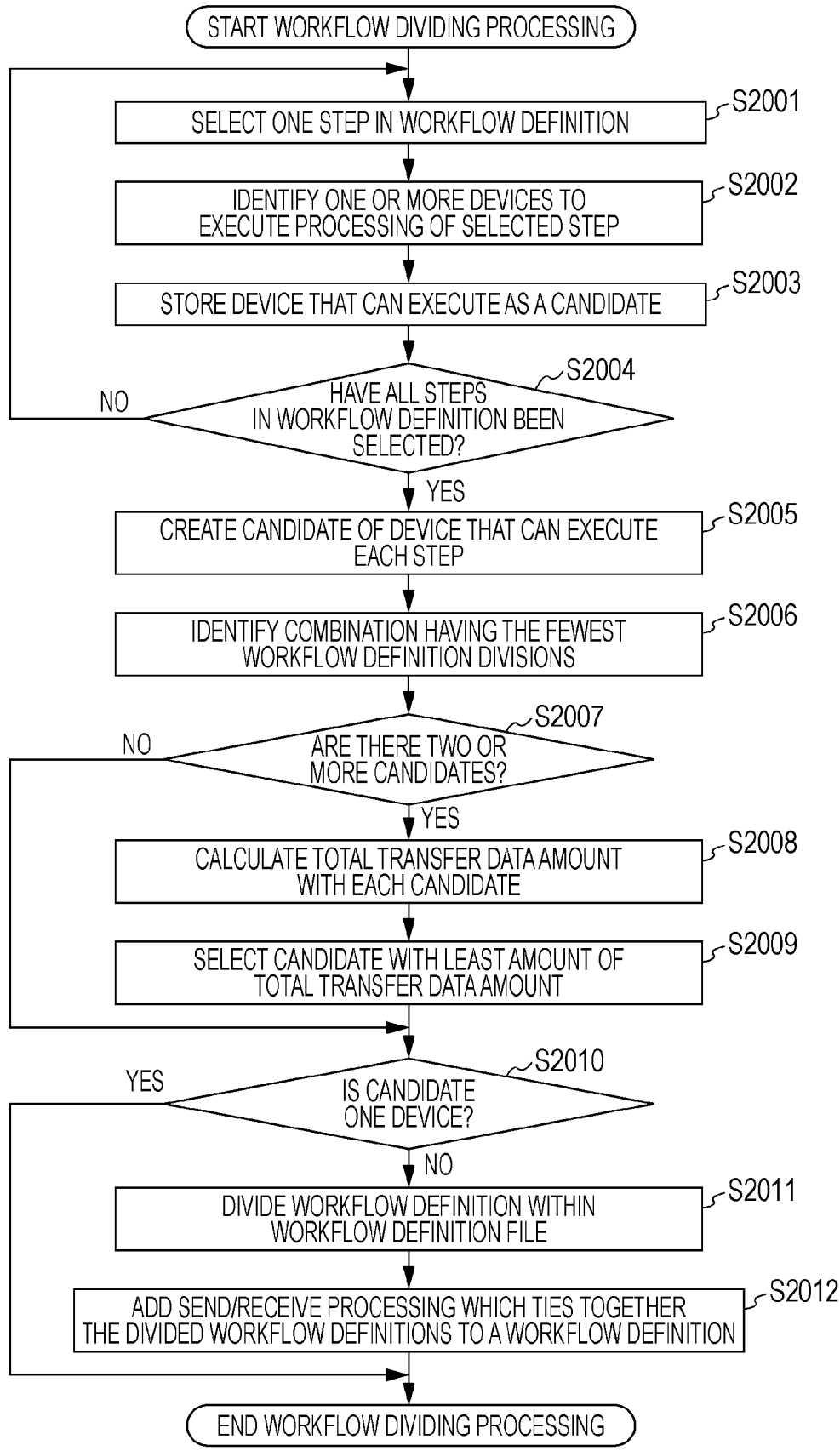
FIG. 23 is a flowchart describing in detail an example of workflow division processing according to a third embodiment of the present invention.

An example of the workflow dividing processing in step S1410 will be described in detail with reference to the flowchart in FIG. 23. Note that the processing of the device (1) in the event of executing the workflow processing based on the workflow definition file 2 is the same as the processing shown in FIG. 16, so detailed description thereof will be omitted.

In step S2001, the data analyzing unit 314 selects the steps in the workflow definition file 1701 modified in step S1409 in sequence from the beginning. In step S2002, the data analyzing unit 314 identifies one device that can execute the processing for the step selected in step S2001.

The data analyzing unit 314 temporarily stores the information of the device identified in step S2002 in the RAM 202 or the like as a candidate for an executable device in step S2003. In step S2004, the data analyzing unit 314 determines whether all of the steps in the workflow definition file 1701 modified in step S1409 have been selected. As a result of the determination therein, in the case that all of the steps in the workflow definition file 1701 have not been selected, the flow is returned to step S2001, and the next step is selected. In the case that all of the steps in the workflow definition file 1701 are selected, the flow is advanced to step S2005.

Upon the flow advancing to step S2005, the workflow definition modifying unit 316 uses the checked results through step S2004 to create a "candidate for executable device" in each step of the workflow definition file 2. With the above-described example, the next candidate is created as "candidate for executable device" in each step of "Scan," "create PDF with user signature," "send PDF to address of number specified in self address book," and "save PDF in Box dedicated for self." That is to say, a combination of "device (1)-device (2)-device (2)-device (1)" and a combination of "device (1)-device (2)-device (2)-device (2)" are created. Further, a combination of "device (1)-device (1)-device (2)-device (1)" and a combination of "device (1) device (1)-device (2)-device (2)" are also created.

In step S2006 the workflow definition modifying unit 316 identifies a combination with the fewest divisions of the workflow definition file, from the candidates created in step S2005. With the above-described example, the combinations of "device (1) device (2)-device (2)-device (2)" and "device (1) device (1) device (2)-device (2)" are identified. Thus, with the present embodiment, having the fewest divisions of the workflow definition file becomes an example of a first determination standard, whereby candidates satisfying the first determination standard are extracted as with step S2006.

In step S2007 the workflow definition modifying unit 316 determines whether there are two or more candidates having the fewest divisions of the workflow definition file. As a result of the determination therein, in the case that there is only one candidate having the fewest divisions of the workflow definition file, the flow is advanced to the later-described step S2010. In the case that there are two or more candidates having the fewest divisions of the workflow definition file, the flow is advanced to step S2008. With the above-described example, determination is made that there are two or more candidates having the fewest divisions of the workflow definition file, and the flow is advanced to step S2008.

Upon the flow advancing to step S2008, the workflow definition modifying unit 316 calculates the total amount of data transferred to the other device (device (2)) for each of the candidates determined to be two or more in step S2007. With the above-described example, the total amount of data amount transferred to the device (2) is estimated with each combination of "device (1) device (2)-device (2)-device (2)" and "device (1) device (1) device (2)-device (2)." With the combination of "device (1) device (2)-device (2)-device (2)," the data transfer performed from the device (1) to the device (2) is performed after the Scan processing, so this becomes Scan data. With the combination of "device (1) device (1) device (2)-device (2)," the data transfer performed from the device (1) to the device (2) becomes the PDF data to which the user signature is appended. With the present embodiment, the estimated value of data amount for each page of Scan data and PDF data are defined within the program executed with the device (1). Accordingly, the workflow definition modifying unit 316 calculates the total amount of data amount transferred using the estimated value therein.

In step S2009, the workflow definition modifying unit 316 identifies a candidate corresponding to the data amount with minimal value from the data amounts (total amount of Scan data and PDF data) calculated in step S2008. With the above-described example, transferring PDF data with signature has less data amount to be transferred than does transferring the Scan data. Accordingly, the combination of "device (1) device (1) device (2)-device (2)" is identified. The flow is then advanced to step S2010. Thus with the present embodiment, having the least amount of data to transfer becomes an example of a second determination standard, and a candidate satisfying the second determination standard is extracted as in step S2009.

Upon the flow advancing to step S2010, the workflow definition modifying unit 316 determines whether the candidate specified in step S2006 is made up of one device instead of a combination of devices. As a result of the determination thereof, in the case that the candidate identified in step S2006 is made up of one device, the processing in steps S2011 and S2012 are skipped and the processing of the flow in FIG. 23 is ended, and the flow is advanced to step S1411 in FIG. 16. In the case that the candidate identified in step S2006 is made up of a combination of devices, the flow is advanced to step S2011.

Upon the flow advancing to step S2011, the workflow definition modifying unit 316 divides the workflow definition in the workflow definition file at modification locations of the device executing the workflow processing, based on the combination identified in steps S2006 or S2009. Thus, with the present embodiment, an example of dividing processing is realized by performing processing in steps S2005 through S2011.

In step S2012 the workflow definition modifying unit 316 adds a send/receive processing to mutually link the workflow definition files divided in step S1011 to the workflow definition file therein and updates the workflow definition file. Thus, the processing based on the divided workflow definition is linked. The processing of the flowchart in FIG. 23 is ended and the flow is advanced to step S1411 in FIG. 16. Thus, with the present embodiment, an example of dividing processing is realized by performing processing in step S2012.

Figure 24:
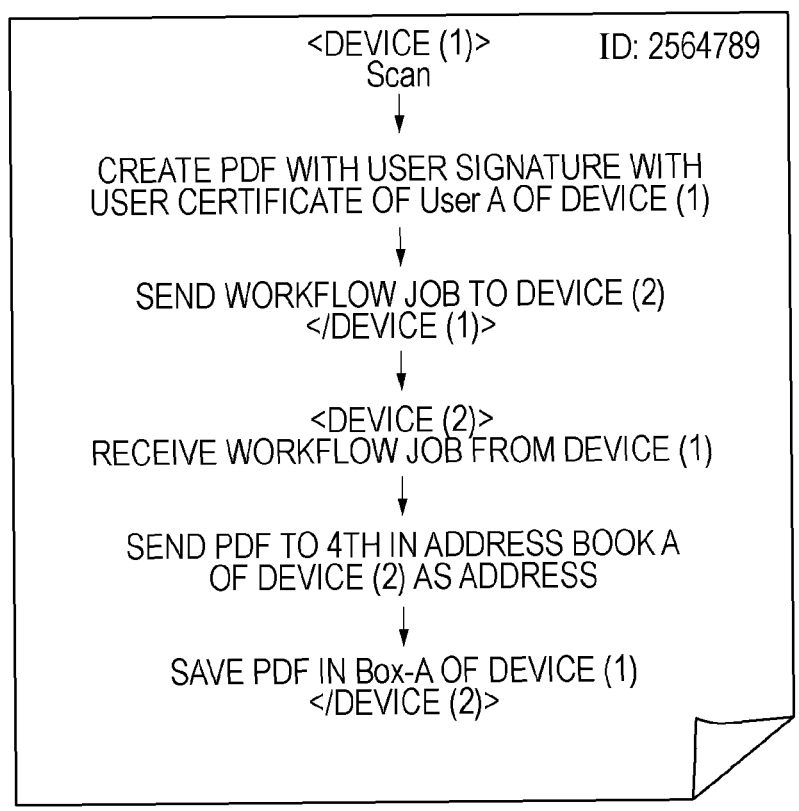
FIG. 24 is a diagram conceptually illustrating an example of a workflow definition file after updating according to a third embodiment of the present invention.

FIG. 24 is a diagram conceptually illustrating an example of a workflow definition file after updating. In FIG. 24, the workflow definition file 2401 differs from the workflow definition file 1701 according to the second embodiment shown in FIG. 19, and becomes a workflow definition as follows. That is to say, with the workflow definition file 2401, up to the creation of the PDF data with signature is performed with the device (1), and the sending to the address in the address book A and the saving to the Box-A of the device (1) are workflows executed with the device (2).

Thus, with the present embodiment, in the case that there are two or more combinations of devices having the fewest divisions of the workflow definition, a "total amount of transfer data" for each combination is computed, and the combination with the least amount of data is selected from the two or more combinations thereof. Accordingly, in addition to the advantages described with the first and second embodiment, an advantage is obtained herein in that the workflow processing can be more efficiently performed (the workflow processing burden is smaller).

Note that with the present embodiment, an example is described in the case of using the total amount of transfer data as a determination standard to identify a combination of devices having the fewest workflow definition divisions. However, a determination standard is not limited to this. For example, an arrangement may be made of a combination such that data transferred to a device closest to the device (1) itself in a network manner is prioritized and selected. Also, an arrangement may be made wherein the execution status for each device at the point-in-time of performing the determination therein is confirmed, and wherein a device having the fewest jobs to processing is prioritized and selected. Further, a device not sleeping may be prioritized and selected, or the usage history of the user devices may be researched and the device with high usage frequency prioritized and selected.

Also, with the present embodiment, and example is described wherein in the case that a combination having the fewest workflow definition divisions is identified, and there are multiple such combinations, the combination having the least total amount of transfer data is identified from the multiple combinations. However, this does not need to be limited. For example, in the case that the combination having the least total amount of transfer data is identified and the combinations thereof are multiple, a combination having the fewest workflow definition divisions may be identified from the multiple combinations. With the example described in the present embodiment, the combination serving as a candidate with the total amount of transfer data amount is reduced to "device (1) device (1) device (2)-device (1)" and "device (1) device (1) device (2)-device (2)." From these combinations, "device (1) device (1)-device (2)-device (2)" is identified as the combination having the fewest workflow definition divisions.

Note that with the present embodiment, various modifications described in the first embodiment can be implemented. Also, with the present embodiment, as with the second embodiment, an example is described of a case to execute the workflow definition file 2, but even in a case of executing the workflow definition file 1 as with the case of the first embodiment, the processing according to the present embodiment can be applied.

A fourth embodiment according to the present embodiment will now be described. With the above-described first through third embodiments, an example is described of a case of dividing the workflow definition and the workflow based on each workflow definition being executed. Conversely, with the present embodiment, an example is described of a case wherein workflow may not be executable based on the various divided workflow definitions. Thus the present embodiment and the above-described first through third embodiments primarily differ in a portion after dividing the workflow definition. Accordingly, with the description of the present embodiment, the portions which are the same as the above-described first through third embodiments show the same reference numerals as the reference numerals shown in FIGS. 1 through 24, and accordingly detailed description thereof will be omitted.

Figure 25A:
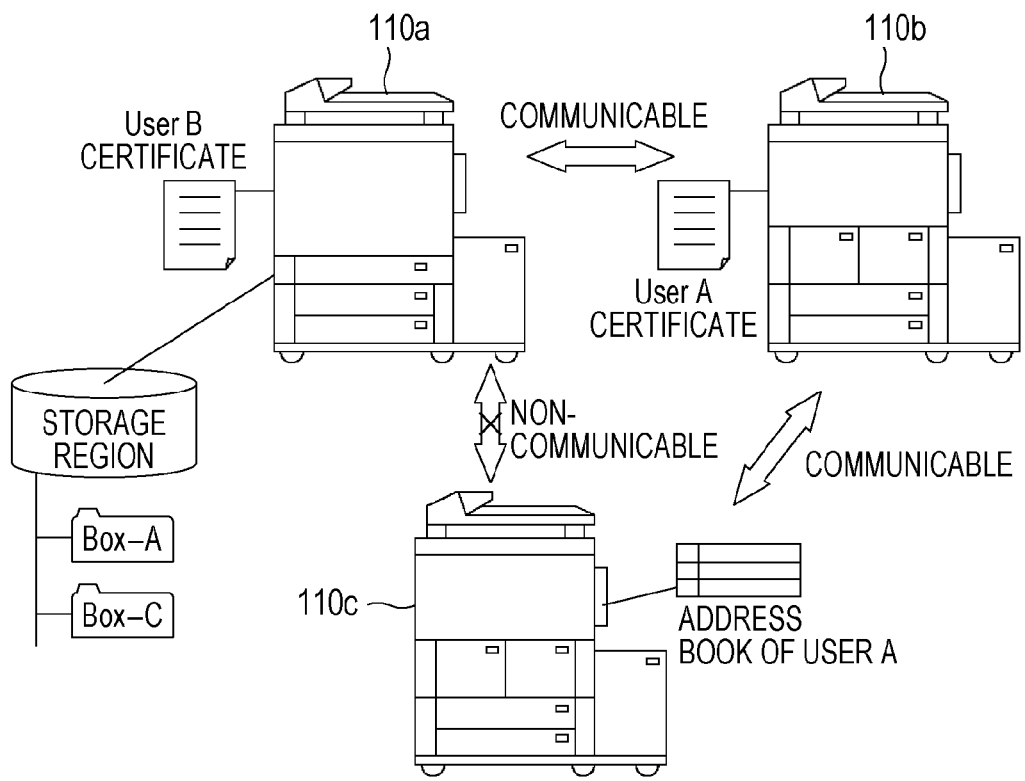
FIGS. 25A and 25B are diagrams illustrating an example of workflow definition content and an environment of the image forming apparatus (device) to execute the workflow processing based on such workflow definition according to a fourth embodiment of the present invention.
Figure 25B:
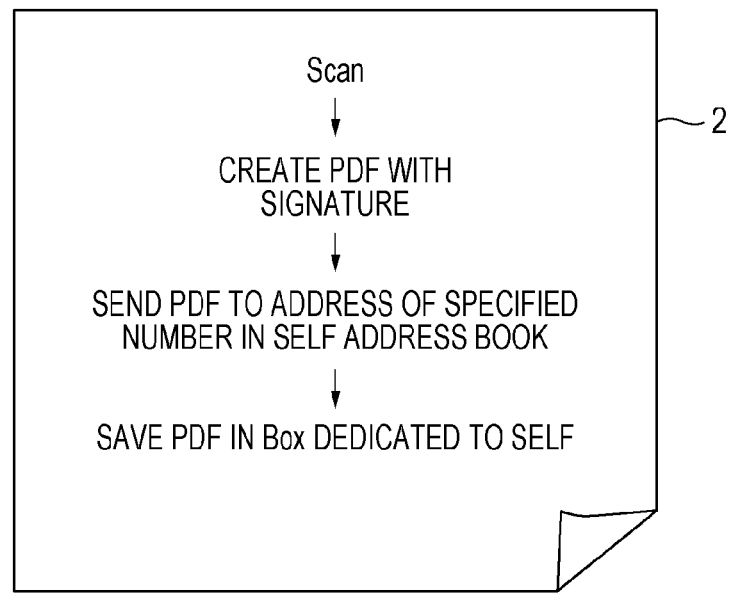

FIGS. 25A and 25B are diagrams illustrating an example of workflow definition content and an environment of the image forming apparatus (device) to execute the workflow processing based on such workflow definition. With the present embodiment, as shown in FIG. 25A, processing will be described in detail with an example wherein a workflow definition file 2 as shown in FIG. 25B is executed in an environment where three image forming apparatuses 110*a*, 110*b*, and 110*c* exist. Note that hereafter, the image forming apparatuses 110*a*, 110*b*, and 110*c* will be called device (1), device (2), and device (3) respectively, as needed.

In FIG. 25, the devices (1), (2), and (3) each have a Scan function, and email-sending function. The devices (1) and (2) each have a function for creating PDF with signature. The user certificate of User B is registered in the device (1), the user certificate of User A is registered in the device (2), and the address book of the User A is registered in the device (3). The Box-A for the User A and the Box-C for the User C exist in the device (1) as user-dedicated storage regions. Further, the device (1) and device (2), and the device (2) and device (3) can mutually communicate via the network 100. Conversely, the device (1) and device (3) cannot mutually communicate via the network 100.

FIG. 26 is a diagram illustrating an example of a management table used to manage user information with a user authentication server 120. As with the second embodiment, the present embodiment can execute saving of data from any device as to the box-A held in the device (1). Also, the address data of the address book A can be referenced from any device. However, sending processing using address data can only be executed with the device wherein the address book exists. With the present embodiment, an example of setting information is realized with the user information shown in FIG. 26.

Figure 27:
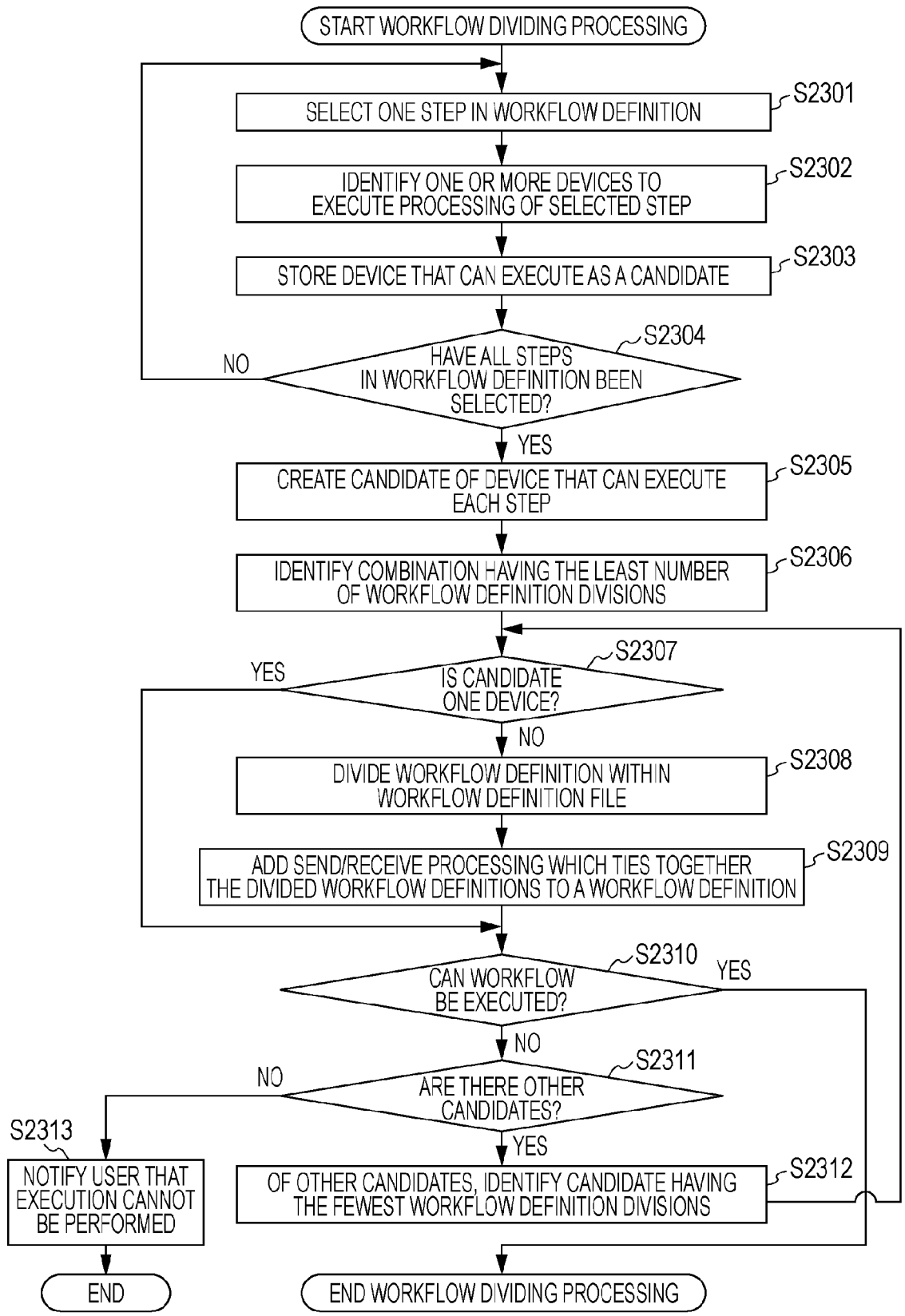
FIG. 27 is a flowchart describing in detail an example of workflow division processing according to a fourth embodiment of the present invention.

An example of workflow dividing processing in step S1410 will be described in detail with reference to the flowchart in FIG. 27. Note that the processing of the device (1) in the event of executing workflow processing based on the workflow definition file 2 is the same as the processing shown in FIG. 16, and accordingly detailed description thereof will be omitted. Note that with the present embodiment also, in the same way as the second embodiment, an example is described wherein the fourth address of the address book A of User A is specified as a parameter, serving as the address of the sending destination of the email to which PDF data with user signature is attached. With the present embodiment, the parameter is also an example of setting information.

In step S2301, the data analyzing unit 314 selects the steps in the workflow definition file 1701 modified in step S1409 in sequence from the beginning. In step S2302, the data analyzing unit 314 identifies one or more devices that can execute the processing for the step selected in step S2301.

In step S2303 the data analyzing unit 314 temporarily stores the information of the device identified in step S2302 in the RAM 202 or the like as a candidate for an executable device.

In step S2304, the data analyzing unit 314 determines whether all of the steps in the workflow definition file 1701 modified in step S1409 have been selected. As a result of the determination therein, in the case that all of the steps in the workflow definition file 1701 have not been selected, the flow is returned to step S2301, and the next step is selected. In the case that all of the steps in the workflow definition file 1701 are selected, the flow is advanced to step S2305.

Upon the flow advancing to step S2305, the workflow definition modifying unit 316 uses the checked results through step S2304 to create a "candidate for executable device" in each step of the workflow definition file 2. With the above-described example, the next candidate is created as "candidate for executable device" in each step of "Scan," "create PDF with user signature," "send PDF to address of number specified in self address book," and "save PDF in Box dedicated for self." That is to say, a combination of "device (1) device (2)-device (3)-device (1)" and a combination of "device (1) device (2)-device (3)-device (3)" and a combination of "device (1)-device (2)-device (3)-device (3)" are created.

In step S2306 the workflow definition modifying unit 316 identifies a candidate with the fewest divisions of the workflow definition, from the candidates created in step S2305. With the above-described example, the combination of "device (1) device (2)-device (3)-device (3)" is identified.

In step S2307 the workflow definition modifying unit 316 determines whether the candidate identified in step S2306 is made up of one device instead of a combination of devices. As a result of the determination thereof, in the case that the candidate identified in step S2306 is made up of one device, the flow is advanced to the later-described step S2310. In the case that the candidate identified in step S2306 is made up of a combination of devices, the flow is advanced to step S2308.

Upon the flow advancing to step S2308, the workflow definition modifying unit 316 divides the workflow definition in the workflow definition file, based on the combination identified in step S2306. Thus, with the present embodiment, an example of dividing processing is realized by performing the processing in steps S2305 through S2308.

In step S2309 the workflow definition modifying unit 316 adds a send/receive processing to mutually link the workflow definition files divided in step S2307 to the workflow definition file therein and updates the workflow definition file. Thus, the processing based on the divided workflow definition is linked. Thus, with the present embodiment, an example of adding processing is realized by performing the processing in step S2309.

Figure 28:
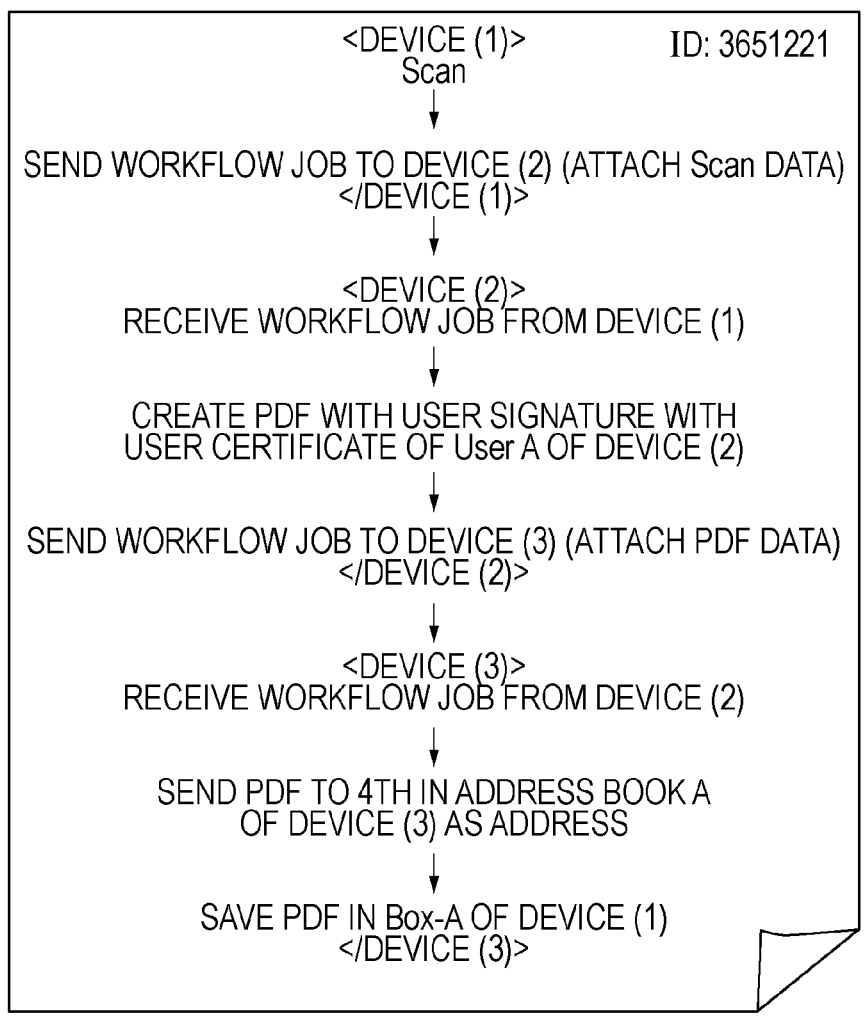
FIG. 28 is a diagram conceptually illustrating an example of a workflow definition file after updating according to a fourth embodiment of the present invention.

FIG. 28 is a diagram conceptually illustrating an example of a workflow definition file 2801 after updating.

In step S2310, the workflow definition modifying unit 316 determines whether the workflow processing based on the workflow definition file can be executed. As a result of the determination thereof, in the case that the workflow processing can be executed, the processing of the flowchart in FIG. 27 is ended and the flow is advanced to step S1411 in FIG. 16. Thus, with the present embodiment, an example of determining processing is realized by performing the processing in step S2310.

In the case that the workflow processing cannot be executed, the flow is advanced to step S2311. As described above, with the present embodiment, the device (1) and device (3) cannot mutually communicate via the network 100. Therefore, with the workflow definition within the workflow definition file 2801 shown in FIG. 28, determination is made that processing cannot be performed for "save PDF in box-A of device (1)" which is the executing processing of device (3).

Upon the flow advancing to step S2311, the workflow definition modifying unit 316 determines whether there are any unselected candidates. As a result of the determination thereof, in the case that all of the candidates have been selected, determination is made that there are no device combinations to execute each step of the workflow definition file 2, and the flow is advanced to step S2313. Upon the flow advancing to step S2313, the user interface processing unit 311 displays on the touch panel unit 420 an image showing that the workflow processing cannot be executed and so forth to notify the user that the workflow processing cannot be executed, and the processing is ended.

In the case there are candidates not yet selected, the flow is advanced to step S2312. Upon advancing to step S2312, the workflow definition modifying unit 316 identifies a candidate having the fewest divisions of the workflow definition. At this time, in the case that there are multiple candidates, as described with the third embodiment, the number of candidates is reduced to 1, based on a determination standard other than the number of divisions of workflow definition (e.g. total amount of transfer data, device usage state, etc). The flow is returned to step S2307.

With the present embodiment, of the combinations created in step S2305, the following combinations are combinations not identified in step S2306 (remaining candidates). That is to say, there are two which are "device (1) device (2)-device (3)-device (1)" and "device (1) device (2)-device (3)-device (2)." The usage status of the device (1) and device (2) is checked, for example, and the device not holding a job is device (2).

In such a case, "device (1) device (2)-device (3)-device (2)" is selected as the next candidate in step S2311, and the processing in step S2306 is executed again. The flow is then returned to step S2307, determination is made that the selected candidate is not made up of one device, and in step S2308 the workflow definition within the workflow definition file is divided at the locations that the device executing the workflow processing is modified. Further, in step S2309, the send/receive processing to mutually link the divided workflow definitions is added to each of the divided workflow definitions.

Figure 29:
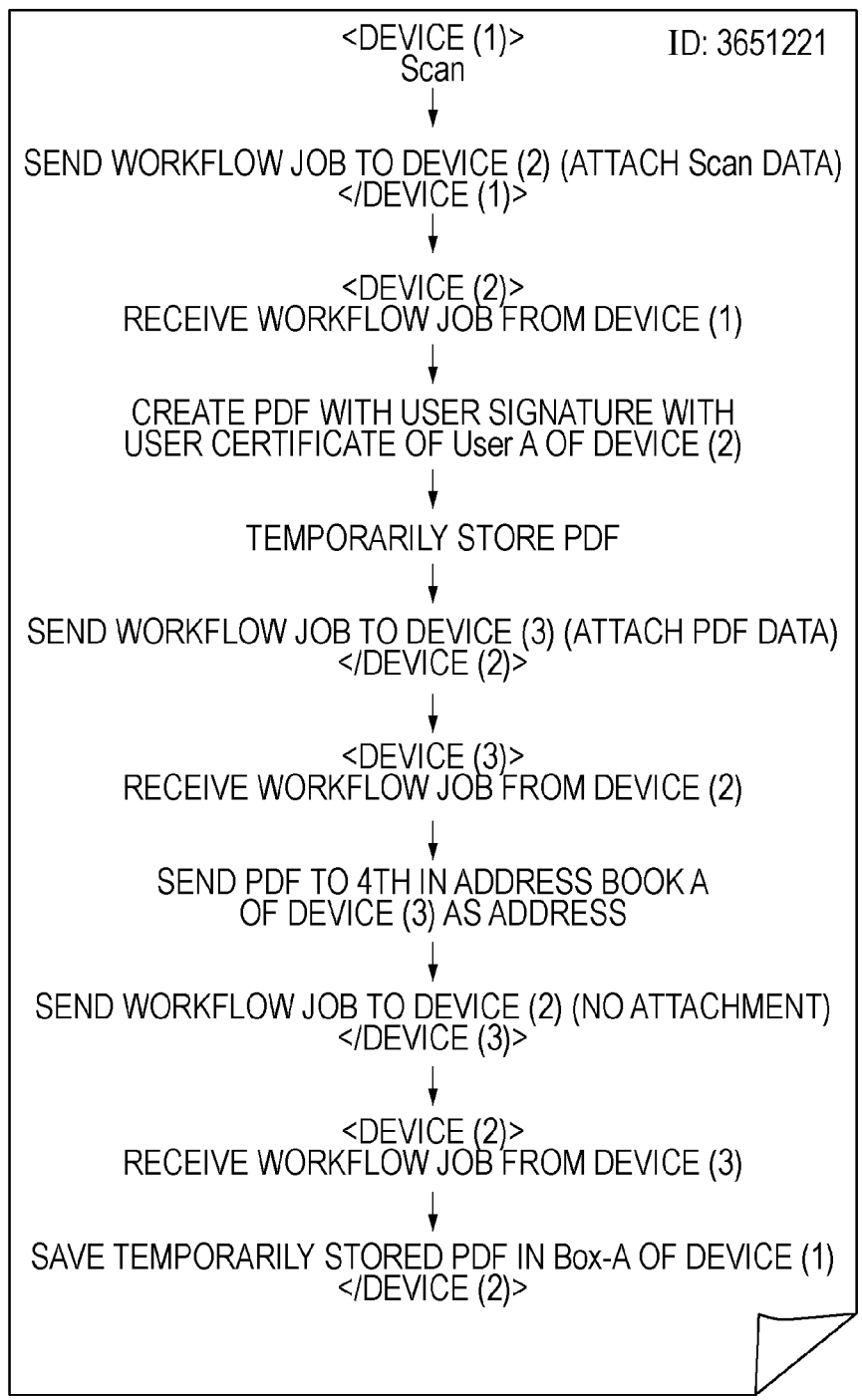
FIG. 29 is a diagram conceptually illustrating an example of a finally obtained workflow definition file according to a fourth embodiment of the present invention.

FIG. 29 is a diagram conceptually illustrating an example of a workflow definition file 2901 thus created.

It is desirable that in step S2309, the workflow definition modifying unit 316 adds processing for linking so that the sent/received data amount is minimal when the send/receive processing to mutually link the divided workflow definitions is added. In the example shown in FIG. 29, the workflow definition modifying unit 316 determines that the data sent from the device (2) to the device (3) is not changed in device (3). The workflow definition modifying unit 316 modifies the workflow definition in the event of sending a workflow job from the device (3) to the device (2) so as to not perform sending of PDF data. Further, the workflow definition modifying unit 316 modifies the workflow definition as follows. That is to say, before sending the workflow job to the device (3), the workflow definition is modified so that the device (2) saves the PDF data with signature as a temporary file in the workflow definition temporary file information storage unit 322. In the event of sending the PDF data file to the Box-A of the device (1), the workflow definition modifying unit 316 modifies the workflow definition to user the PDF data file saved as a temporary file. This processing is executed in step S2309. In step S2310, determination is made that the workflow based on the workflow definition can be executed, the processing of the flowchart in FIG. 27 is ended, and the flow is advanced to step S1411 in FIG. 16.

Thus with the present embodiment, upon dividing the workflow definition so that the divisions are optimal, determination is made as to whether the workflow thereof can be executed. In the case the workflow cannot be executed, division of the workflow definition is performed at locations different from the previous division locations, so that even if the workflow definition division is not optimal, the workflow can be executed. Accordingly, in addition to the advantages described with the above-described first through third embodiments, an advantage can be obtained wherein an optimal workflow definition can be actively generated and executed according to the execution environment.

Further, with the present embodiment, in the event of adding the send/receive processing of data for mutually linking the divided workflow definitions to the workflow definition, data not requiring send/receive has not be sent/received. Accordingly, an optimal workflow definition can be actively generated and executed.

Note that the processing to not send/receive the data not requiring such sending/receiving may be applied to the first through third embodiments. Also, with the present embodiment, various types of modification examples described with the first embodiment may be taken.

The various units making up the workflow executing apparatus according to the above-described embodiments of the present invention and the various steps of the workflow execution method thereof can be realized by a program stored in a RAM or ROM of a computer being run. A computer-readable recording medium having recorded the program therein and the above-mentioned program is included in the present invention.

Also, for example, an embodiment with a system, apparatus, method, program, or recording medium may be used, and specifically, may be applied to a system made up of multiple devices or may be applied to an apparatus made up of one device.

Note that the present invention includes supplying a software program realizing the functions of the embodiments as described above (a program corresponding to the flowcharts in FIGS. 7, 11, 13, 16, 18, 20, 23, and 27 according to the embodiments) directly to the system or an apparatus, or from a remote location. A case wherein a computer of a system or apparatus reads and executes the supplied program code is also included in the present invention.

Accordingly, in order for the function processing of the present invention to be realized with the computer, the program code itself that is installed in the computer realizes the present invention. That is to say, the present invention includes the computer program itself to realize the function processing of the present invention.

In such a case, the form of the program is not restricted in particular, and may be object code, a program executed by an interpreter, script data supplied to the OS, or the like, as long as there is a program function.

Examples of recording media to supply the program include flexible disks, hard disks, optical discs (CD (including CD-ROM, CD-R, CD-RW), DVD (including DVD-ROM, DVD-R), etc.), magneto-optical disks (MO), magnetic tape, non-volatile memory card, ROM, and so forth.

As a program supplying method, a browser of the client computer may be used to connect to a website on the Internet. The computer program itself according to the present invention may be supplied from the website, or compressed files including an automatic install function may be downloaded onto a recording medium such as the hard disk to supply the program.

Also, the program code making up the program according to the present invention may be divided into multiple files, and each file may be downloaded from different web pages. That is to say, a WWW server to download the program file to realize the function processing of the present invention with a computer as to multiple users is included in the present invention.

Also, the program of the present invention may be encoded and stored in a storage medium such as a CD-ROM or the like and distributed to users, and the key information to decode the encoding may be downloaded from the website via the Internet as to a user that has cleared predetermined conditions. The program encoded by using the downloaded key information can be executed and installed in the computer.

Also, the functions of the embodiments described above can be realized by a computer executing the read out program. Additionally, based on instructions of the program, an OS operating on a computer performs a portion or all of the actual processing, and the functions of the above-described embodiment can be realized with such processing.

Further, the program read out from the recording medium is written in memory provided to a function expansion board inserted in the computer or a function expansion unit connected to the computer. Subsequently, based on instructions of the program, the CPU provided to such function expansion board or function expansion unit performs a portion or all of the actual processing, and the functions of the embodiments described above can be realized with the processing thereof.

Note that the various above-described embodiments are only specific examples in performing the present invention, and the technical scope of the present invention should not be comprehended in a limited manner. That is to say, the present invention can be carried out in various forms without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-125113 filed May 12, 2008, which is hereby incorporated by reference herein in its entirety.

What is claimed is:

1. A workflow executing apparatus, in a plurality of workflow executing apparatuses, which executes a workflow comprising a plurality of steps as defined by a workflow definition, the workflow executing apparatus comprising:

a processor;

an obtaining unit to obtain personal information associated with a user instructing the workflow to be executed and related to the execution of the workflow;

a modifying unit to modify the workflow definition corresponding to the workflow to be executed, based on the personal information obtained with the obtaining unit;

a dividing unit to divide the workflow definition modified with the modifying unit into a plurality of divided workflow definitions;

an adding unit to add processing to link together the plurality of divided workflow definitions divided with the dividing unit;

an executing unit to execute at least one of the plurality of divided workflow definitions divided with the dividing unit;

a sending unit to send at least one other divided workflow definition divided with the dividing unit to a second workflow executing apparatus in the plurality of workflow executing apparatuses, wherein the second workflow executing apparatus executes a portion of the workflow as defined by the at least one other divided workflow definition; and wherein the dividing unit determines whether each workflow apparatus in the plurality of workflow executing apparatuses is able to execute each portion of the workflow as defined by each of the plurality of divided workflow definitions to be initially divided with the dividing unit, and extracts one or more candidate workflow executing apparatuses, which in combination, can sequentially execute the workflow as defined by the plurality of divided workflow definitions; and wherein the one or more extracted candidates are selected with the combination requiring the fewest number of divisions; and wherein the workflow definition modified with the modifying unit is then divided based on the selected combination of workflow executing apparatuses.

2. The workflow executing apparatus according to claim 1, further comprising:

a setting unit to append one common identifier to each of the plurality of divided workflow definitions divided with the dividing unit.

3. The workflow executing apparatus according to claim 2, wherein the sending unit sends a completed portion of the workflow after the executing unit executes the at least one of the plurality of divided workflow definitions, together with the at least one other divided workflow definition.

4. The workflow executing apparatus according to claim 1, further comprising:

a determining unit to determine whether each of the plurality of divided workflow definitions divided with the dividing unit can be executed with each of the plurality of workflow executing apparatuses;

wherein, upon determining that at least one of the plurality of divided workflow definitions cannot be executed by any of the plurality of workflow executing apparatuses, the workflow definition modified with the modifying unit is then re-divided in locations within the modified workflow definition which are different from the prior divisions of the modified workflow definition.

5. The workflow executing apparatus according to claim 1, further comprising:

a determining unit to determine whether there is at least one step in the workflow, as defined by the workflow definition, which cannot be executed by the executing unit, wherein, upon determining that there is at least one step in the workflow which cannot be executed by the executing unit, the dividing unit then divides the workflow definition modified with the modifying unit into a plurality of divided workflow definitions.

6. The workflow executing apparatus according to claim 1, wherein the dividing unit divides a plurality of files including the workflow definition.

7. The workflow executing apparatus according to claim 1, wherein the dividing unit divides the workflow definition into a plurality of workflow definition files for the selected workflow executing apparatuses.

8. The workflow executing apparatus according to claim 1, further comprising:

a copying unit to copy the workflow definition corresponding to the workflow to be executed, wherein the modifying unit then modifies the workflow definition that is copied by the copying unit.

9. A computer-implemented workflow executing method to execute a workflow comprising a plurality of steps as defined by a workflow definition, the method comprising:

obtaining personal information associated with a user instructing the workflow to be executed and related to the execution of the workflow;

modifying the workflow definition corresponding to the workflow to be executed, based on the personal information obtained;

dividing the workflow definition modified with the modifying unit into a plurality of divided workflow definitions;

adding processing to link together the plurality of divided workflow definitions divided with the dividing unit;

executing at least one of the plurality of divided workflow definitions divided; and sending at least one other divided workflow definition divided to another workflow executing apparatus, wherein the other workflow executing apparatus executes a portion of the workflow as defined by the at least one other divided workflow definition, wherein the dividing step determines whether each workflow apparatus in the plurality of workflow executing apparatuses is able to execute each portion of the workflow as defined by each of the plurality of divided workflow definitions to be initially divided by the dividing step, and extracts one or more candidate workflow executing apparatuses, which in combination, can sequentially execute the workflow as defined by the plurality of divided workflow definitions; and wherein the one or more extracted candidates are selected with the combination requiring the fewest number of divisions; and wherein the modified workflow definition is then divided based on the selected combination of workflow executing apparatuses.

10. A computer-readable memory storing a program for causing a computer to execute a workflow executing method to execute a workflow comprising a plurality of steps as defined by a workflow definition, the method comprising:

obtaining personal information associated with a user instructing the workflow to be executed and related to the execution of the workflow;

modifying the workflow definition corresponding to the workflow to be executed, based on the personal information obtained;

dividing the workflow definition modified with the modifying unit into a plurality of divided workflow definitions;

adding processing to link together the plurality of divided workflow definitions divided with the dividing unit;

executing at least one of the plurality of divided workflow definitions divided; and sending at least one other divided workflow definition divided to another workflow executing apparatus, wherein the other workflow executing apparatus executes a portion of the workflow as defined by the at least one other divided workflow definition, wherein the dividing step determines whether each workflow apparatus in the plurality of workflow executing apparatuses is able to execute each portion of the workflow as defined by each of the plurality of divided workflow definitions to be initially divided by the dividing step, and extracts one or more candidate workflow executing apparatuses, which in combination, can sequentially execute the workflow as defined by the plurality of divided workflow definitions; and wherein the one or more extracted candidates are selected with the combination requiring the fewest number of divisions; and wherein the modified workflow definition is then divided based on the selected combination of workflow executing apparatuses.

* * * * *